United States Patent
Sambonsugi

(10) Patent No.: US 11,064,146 B2
(45) Date of Patent: Jul. 13, 2021

(54) IMAGE CAPTURING APPARATUS AND CONTROL METHOD THEREFOR

(71) Applicant: CANON KABUSHIKI KAISHA, Tokyo (JP)

(72) Inventor: Hideaki Sambonsugi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/600,800

(22) Filed: Oct. 14, 2019

(65) Prior Publication Data

US 2020/0128200 A1 Apr. 23, 2020

(30) Foreign Application Priority Data

Oct. 17, 2018 (JP) .............................. JP2018-196072

(51) Int. Cl.
*H04N 5/376* (2011.01)
*H04N 5/3745* (2011.01)

(52) U.S. Cl.
CPC ......... *H04N 5/376* (2013.01); *H04N 5/37455* (2013.01)

(58) Field of Classification Search
CPC .. H04N 5/376; H04N 5/37455; H04N 5/3658; H04N 5/378
See application file for complete search history.

(56) References Cited

U.S. PATENT DOCUMENTS

| | | | | |
|---|---|---|---|---|
| 2006/0266923 A1* | 11/2006 | Mabuchi | ............... | H04N 5/355 250/208.1 |
| 2015/0156432 A1* | 6/2015 | Tozawa | ............... | H04N 5/3456 348/302 |
| 2017/0353674 A1* | 12/2017 | Kobayashi | ........... | H04N 5/3653 |
| 2017/0353676 A1* | 12/2017 | Kobayashi | ........... | H04N 5/3653 |
| 2019/0082129 A1* | 3/2019 | Kato | .................. | H04N 5/36963 |

FOREIGN PATENT DOCUMENTS

JP  2010-263553 A  11/2010

* cited by examiner

*Primary Examiner* — Gevell V Selby
(74) *Attorney, Agent, or Firm* — Cowan, Liebowitz & Latman, P.C.

(57) ABSTRACT

An image capturing apparatus that comprises a pixel region in which a plurality of pixels for performing photoelectric conversion are arranged in a matrix, and column circuits plurally arranged for each column of the pixel region and to which signals of the pixel region are outputted, the apparatus comprising: a correction unit configured to correct image data outputted from the pixel region based on a difference in a characteristic of the plurality of column circuits; and a control unit configured to control so as to output the image data using a first column circuit of the plurality of column circuits and to output correction data for correction value generation by the correction unit using a second column circuit different from the first column circuit.

17 Claims, 24 Drawing Sheets

FIG. 5

| VD | LV_0 | LV_1 | LV_2 | LV_3 | LV_4 | LV_5 | STILL IMAGE | LV_6 | LV_7 |
|---|---|---|---|---|---|---|---|---|---|
| FRAME No. | LV_0 | LV_1 | LV_2 | LV_3 | LV_4 | LV_5 | STILL IMAGE | LV_6 | LV_7 |
| IMAGE SETTING ISO | — (NO OUTPUT IMAGE) | ISO200 | ISO200 | ISO200 | ISO1600 | ISO1600 | ISO1600 | ISO1600 | ISO1600 |
| READ OUT IMAGE DATA | NO READ OUT | COLUMN OUTPUT LINE 1/3 | COLUMN OUTPUT LINE 1/3 | COLUMN OUTPUT LINE 1/3 | COLUMN OUTPUT LINE 2/4 | COLUMN OUTPUT LINE 2/4 | COLUMN OUTPUT LINE 0-5 | COLUMN OUTPUT LINE 2/4 | COLUMN OUTPUT LINE 2/4 |
| READ OUT DATA FOR CORRECTION VALUE GENERATION | COLUMN OUTPUT LINE 1/3 | NO READ OUT | NO READ OUT | COLUMN OUTPUT LINE 2/4 | NO READ OUT | NO READ OUT | — | NO READ OUT | NO READ OUT |
| DATA OUTPUT UNIT A OUTPUT | power off | LV IMAGE | LV IMAGE | LV IMAGE | LV IMAGE | LV IMAGE | STILL IMAGE | LV IMAGE | LV IMAGE |
| DATA OUTPUT UNIT B OUTPUT | DATA FOR CORRECTION VALUE GENERATION | power off | power off | DATA FOR CORRECTION VALUE GENERATION | power off | power off | — | power off | power off |
| RAM0 STATE | LV CORRECTION VALUE (ISO 200) USE FOR CORRECTION | LV CORRECTION VALUE (ISO 200) USE FOR CORRECTION | LV CORRECTION VALUE (ISO 200) USE FOR CORRECTION | LV CORRECTION VALUE (ISO 1600) USE FOR CORRECTION | LV CORRECTION VALUE (ISO 1600) USE FOR CORRECTION | STILL IMAGE CORRECTION VALUE (ISO 1600) WRITE FROM CPU | STILL IMAGE CORRECTION VALUE (ISO 1600) USE FOR CORRECTION | — | — |
| RAM1 STATE | — | — | — | LV CORRECTION VALUE (ISO 1600) GENERATE CORRECTION VALUE | LV CORRECTION VALUE (ISO 1600) USE FOR CORRECTION | LV CORRECTION VALUE (ISO 1600) USE FOR CORRECTION | LV CORRECTION VALUE (ISO 1600) HOLD | LV CORRECTION VALUE (ISO 1600) USE FOR CORRECTION | LV CORRECTION VALUE (ISO 1600) USE FOR CORRECTION |

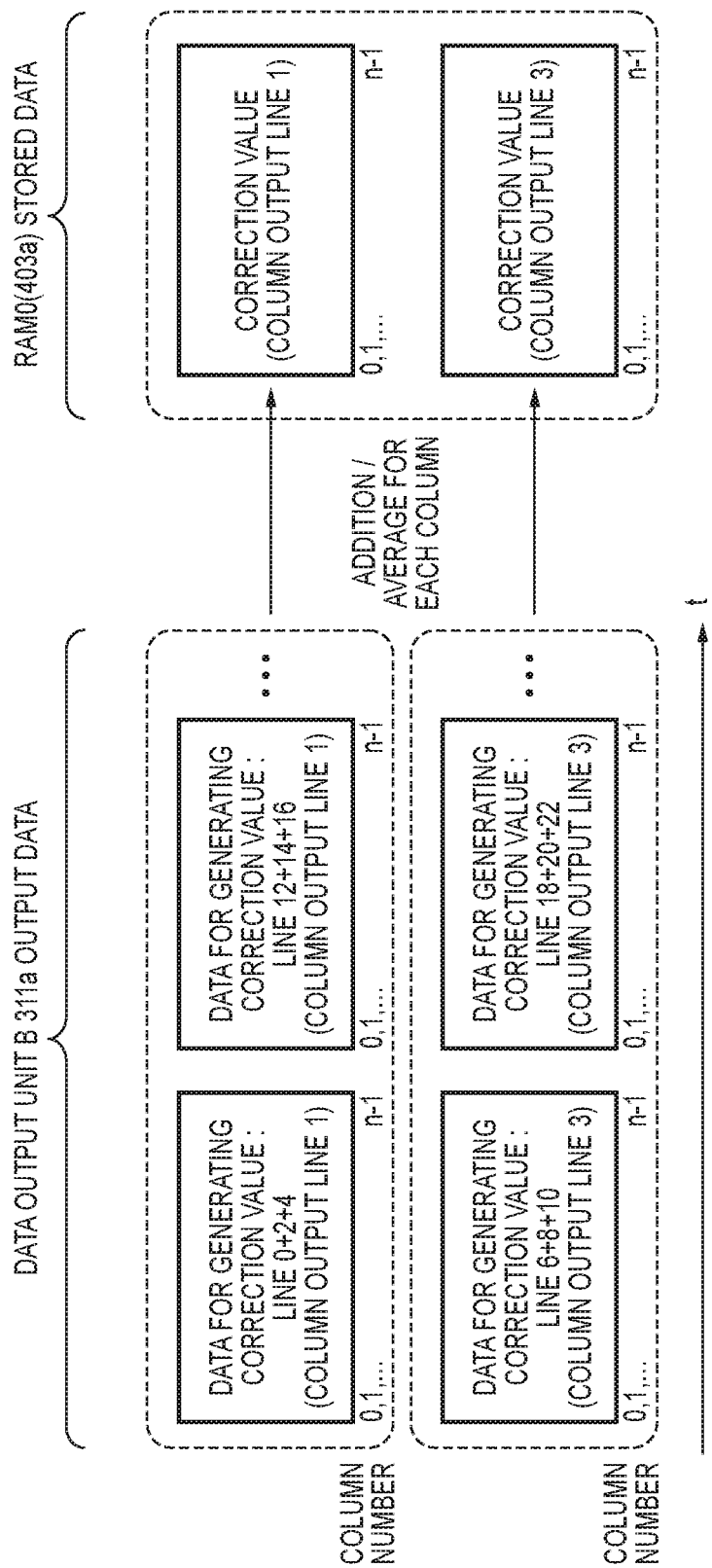

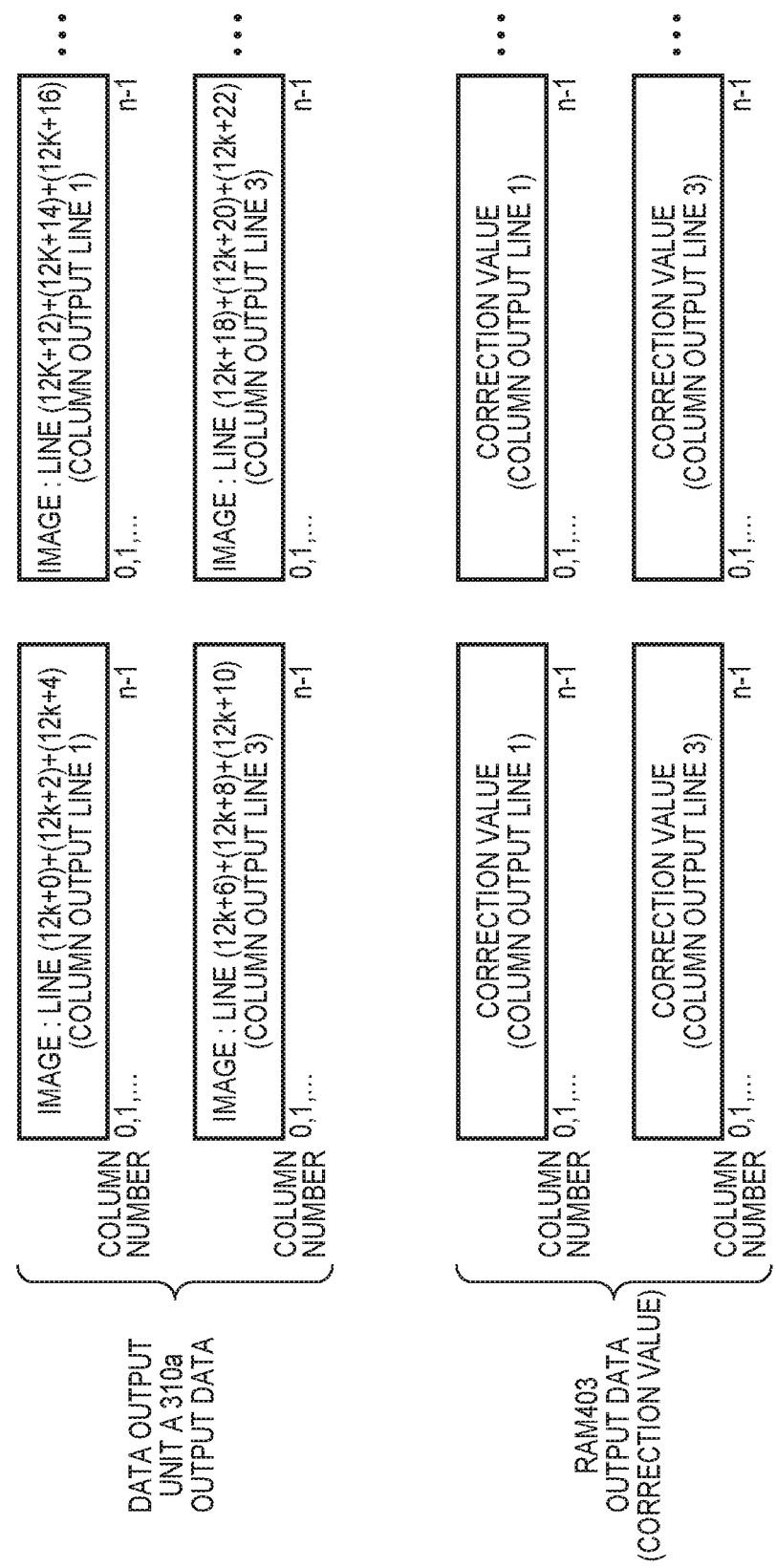

IMAGE CAPTURING APPARATUS AND CONTROL METHOD THEREFOR

BACKGROUND OF THE INVENTION

Field of the Invention

The present invention relates to an image capturing apparatus and a control method thereof.

Description of the Related Art

In imaging elements such as a CMOS sensor used in an image capturing apparatus, shading in a vertical direction and a horizontal direction is present due to non-uniformity of pixels. In particular, in the horizontal direction, there is shading dependent upon the readout circuit for each column, non-uniformity of memory, or the distance from the memory to where a signal is outputted via an output line. For example, Japanese Patent Laid-Open No. 2010-263553 discloses an image capturing apparatus in which signals outputted from an imaging element are corrected by a correction function of the image capturing apparatus, thereby making the signals uniform.

However, in the prior art disclosed in Japanese Patent Laid-Open No. 2010-263553, it is necessary to store in advance a correction value for each column for each driving condition in order to cope with a case where a driving condition of an imaging element (such as gain control) changes or to cope with differences in driving modes for still images, moving images, or the like. In this case, a load on the system such as stress on the capacity of a ROM or the like for storage occurs. In addition, in a case where correction values are generated when the capturing condition changes, it is necessary to interrupt image capturing in order to generate the correction values, and there is a problem that a frame is blacked out in a moving image or the like.

SUMMARY OF THE INVENTION

The present invention has been made in view of the above-mentioned problems, and provides an image capturing apparatus capable of improving the image quality of a captured image while suppressing an increase in the load of the apparatus.

According to a first aspect of the present invention, there is provided an image capturing apparatus comprising: a pixel region in which a plurality of pixels for performing photoelectric conversion are arranged in a matrix; column circuits plurally arranged for each column of the pixel region and to which signals of the pixel region are outputted; and at least one processor or circuit configured to function as the following units: a correction unit configured to correct image data outputted from the pixel region based on a difference in a characteristic of the plurality of column circuits; and a control unit configured to control so as to output the image data using a first column circuit of the plurality of column circuits and to output correction data for correction value generation by the correction unit using a second column circuit different from the first column circuit.

According to a second aspect of the present invention, there is provided a method for controlling an image capturing apparatus that comprises a pixel region in which a plurality of pixels for performing photoelectric conversion are arranged in a matrix, and column circuits plurally arranged for each column of the pixel region and to which signals of the pixel region are outputted, the method comprising: correcting image data outputted from the pixel region based on a difference in a characteristic of the plurality of column circuits; controlling so as to output the image data using a first column circuit of the plurality of column circuits and to output correction data for correction value generation by the correcting using a second column circuit different from the first column circuit.

Further features of the present invention will become apparent from the following description of exemplary embodiments with reference to the attached drawings.

BRIEF DESCRIPTION OF THE DRAWINGS

FIGS. 2A-1 and 2A-2 are diagrams illustrating a configuration of an imaging element in the first embodiment.

FIG. 5 is a diagram illustrating a concept regarding operation of the image capturing apparatus in the first embodiment.

FIG. 9 is a diagram illustrating a concept regarding operation of a DFE in the first embodiment.

FIG. 11 is a diagram illustrating a concept regarding operation of the DFE in the first embodiment.

DESCRIPTION OF THE EMBODIMENTS

Hereinafter, referring to the attached drawings, embodiments of the present invention will be described in detail.

First Embodiment

Figure 1:
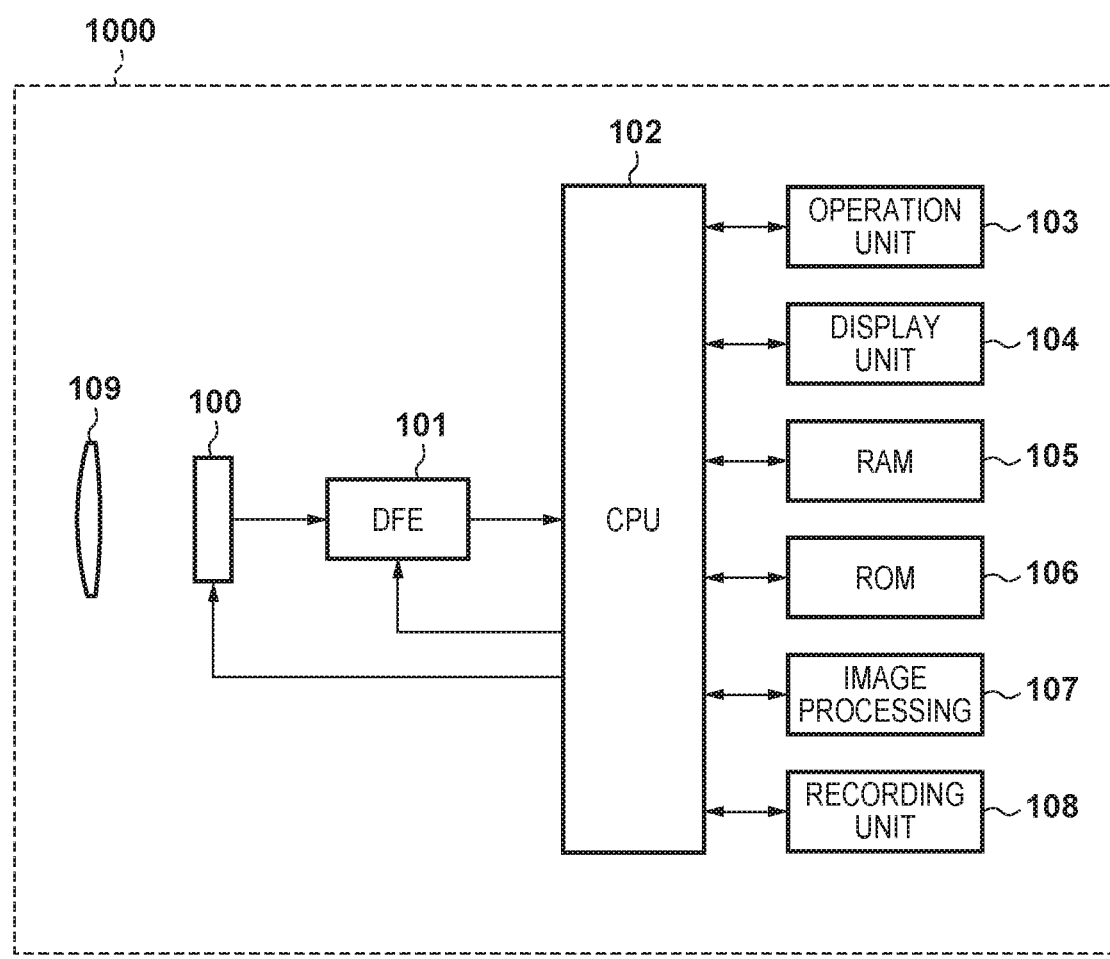
FIG. 1 is a diagram illustrating a configuration of an image capturing apparatus according to a first embodiment of the present invention.

FIG. 1 is a block diagram illustrating a configuration of an image capturing apparatus according to a first embodiment of the present invention. An image capturing apparatus 1000 of the present embodiment is, for example, a digital camera, and has a still image capturing function and a moving image capturing function. The image capturing apparatus 1000 includes a CPU (Central Processing Unit) 102 that controls the image capturing apparatus 1000 as a whole, and an imaging element 100 on which an optical image that has passed through an image capturing lens 109 is formed.

The imaging element 100 converts the optical image formed thereon into an electrical signal (analog pixel signal), and then converts the electrical signal into digital image data according to a predetermined number of quantization bits, and outputs the digital image data. A DFE (Digital Front End) 101 receives data from the imaging element 100, performs a correction process for correcting image data on the basis of differences in characteristics of respective column circuits on an image, which will be described later, and transmits the data to a CPU 102.

A RAM (Random Access Memory) 105 is an image memory for storing image data outputted from the imaging element 100 and image data processed by an image processing unit 107. The RAM 105 is also used as a work memory of the CPU 102. In the present embodiment, the RAM 105 is used as an image memory and a work memory, but other memories may be used if there are no access speed problems.

A ROM (Read Only Memory) 106 stores programs that operate on CPU 102. In the present embodiment, a flash ROM is used as the ROM 106, but other memories may be used if there are no access speed problems.

The image processing unit 107 performs correction processing on still images and moving images, image compression processing, and the like in the present embodiment. The operation unit 103 includes a main switch for activating the image capturing apparatus 1000 and an image capture switch for a user to instruct the image capturing apparatus 1000 to capture a still image or a moving image, and which is also used when setting image capturing conditions or the like. A display unit 104 displays a still image or a moving image according to image data and displays menus and the like under the control of the CPU 102.

A recording unit 108 is, for example, a nonvolatile memory or a hard disk, and records image data and the like. In the present embodiment, the recording unit 108 is described as being built into the apparatus, but it may be an external storage medium such as a memory card that is detachable via a connector or the like.

Figures 1, 2A:
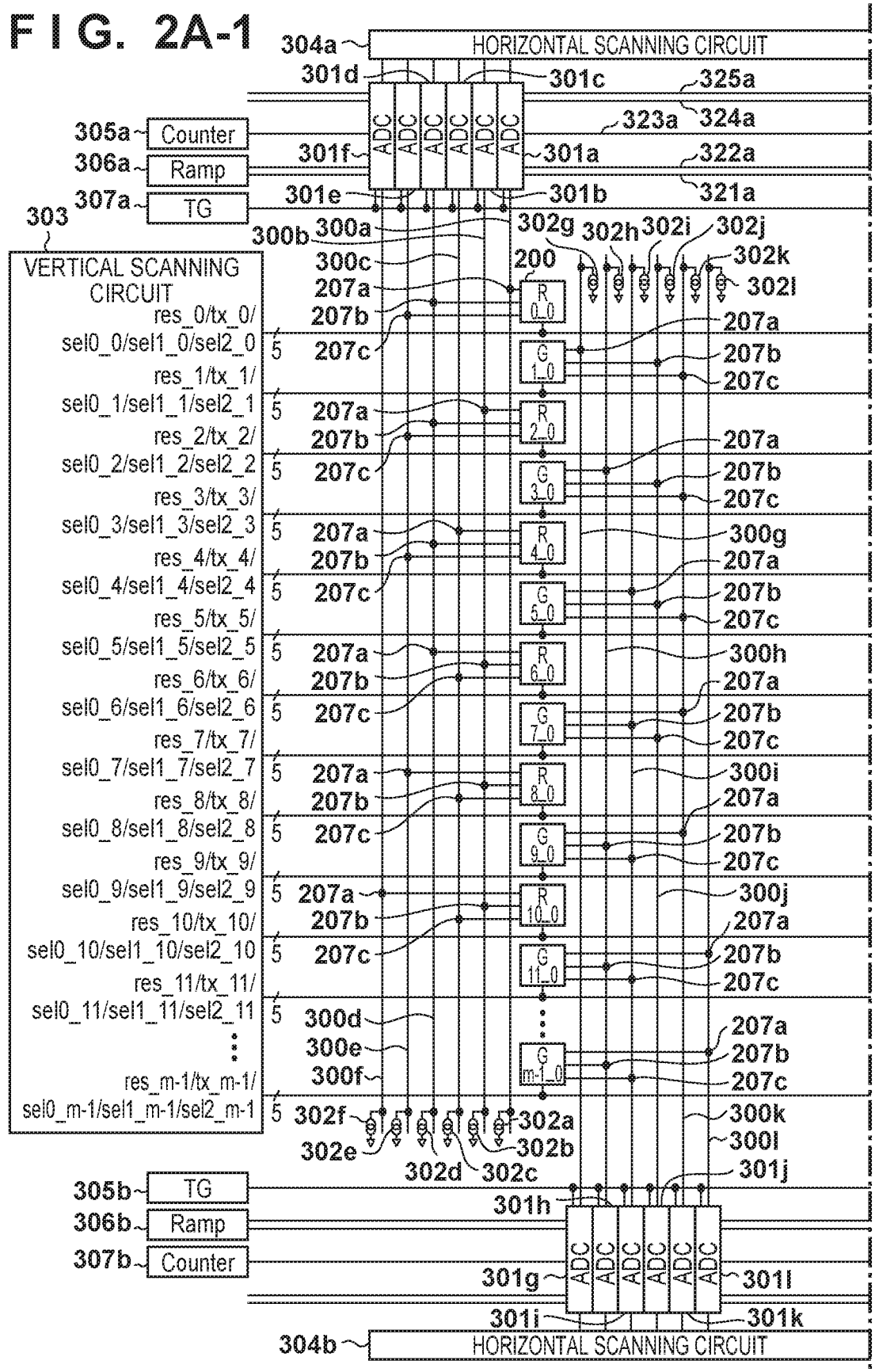
Figures 2, 2A:
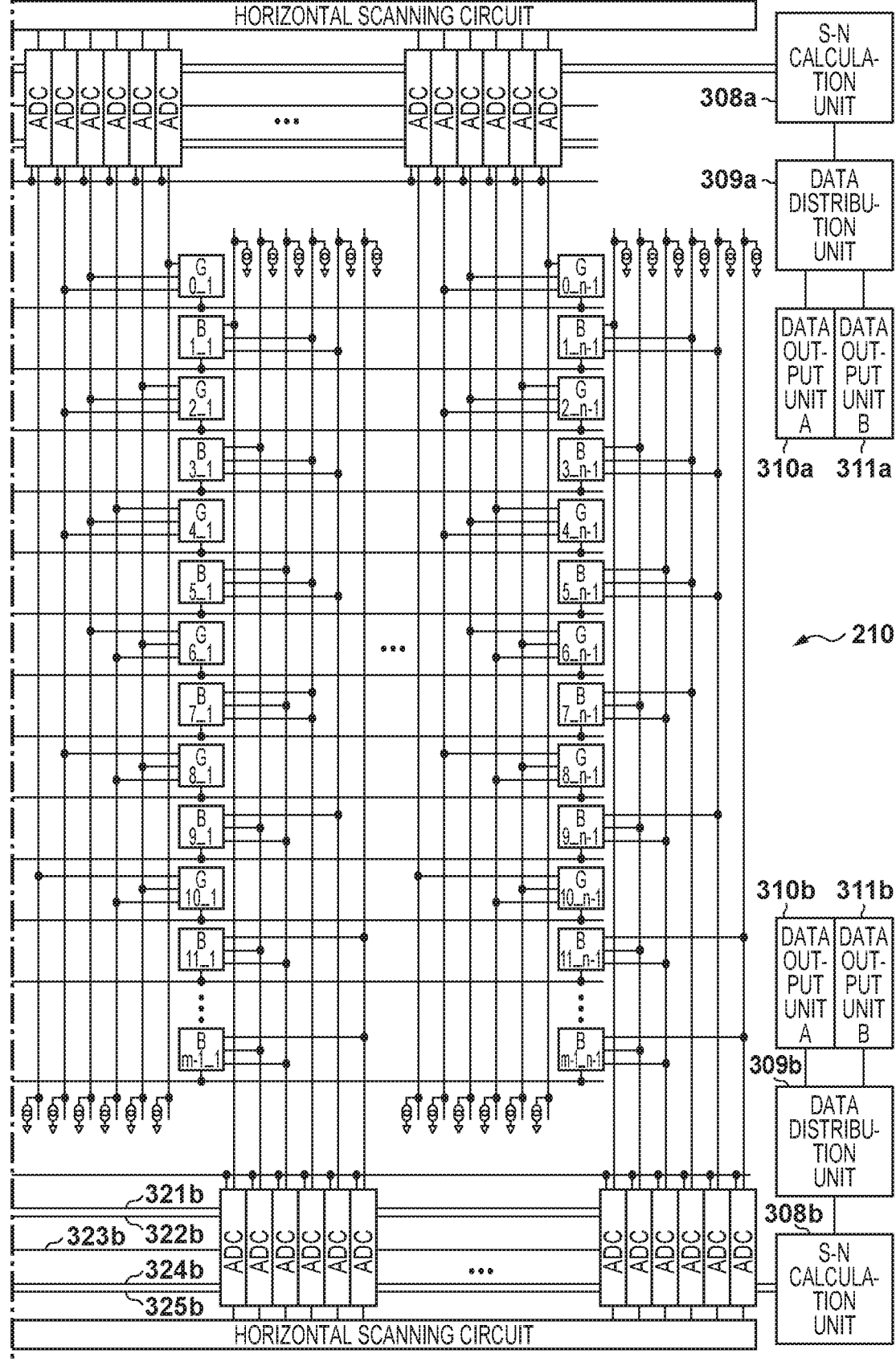
Figure 2B:
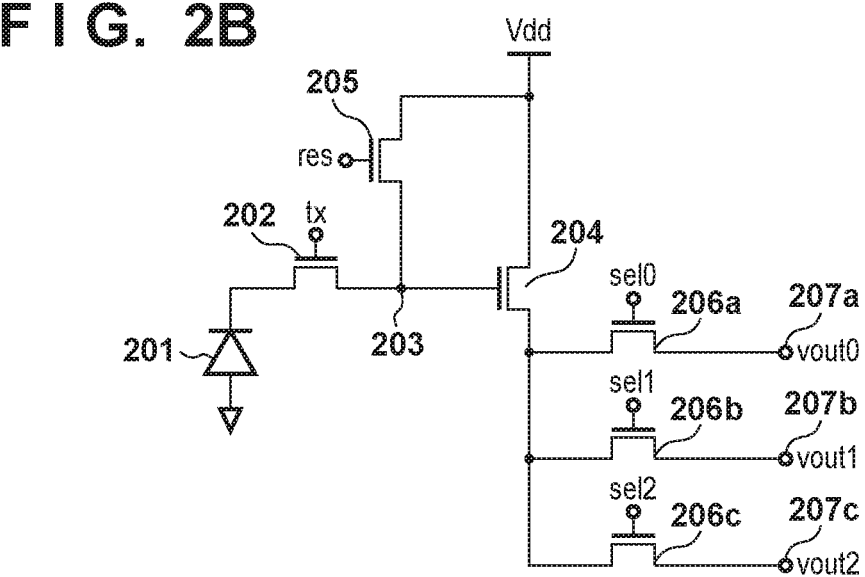
FIG. 2B is a diagram illustrating a configuration of an imaging element in the first embodiment.
Figure 2C:
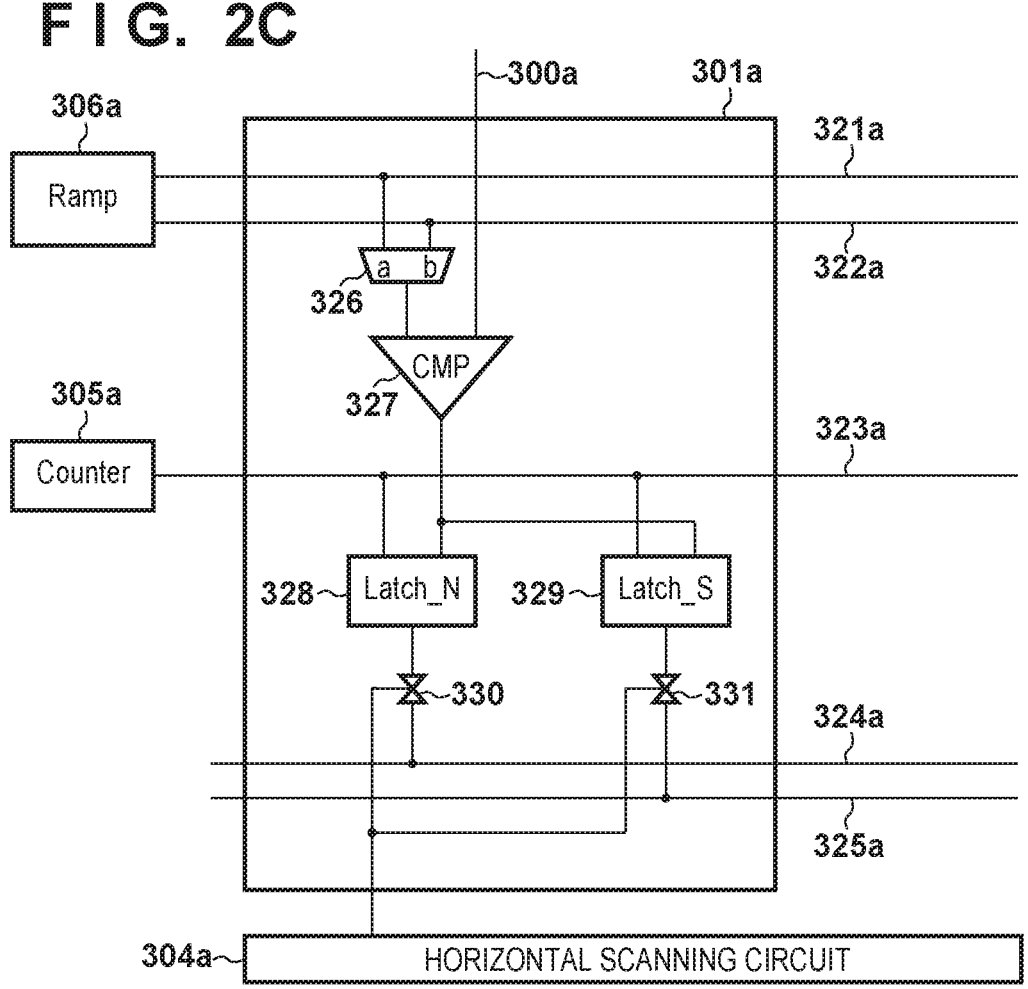
FIG. 2C is a diagram illustrating a configuration of an imaging element in the first embodiment.
Figure 2D:
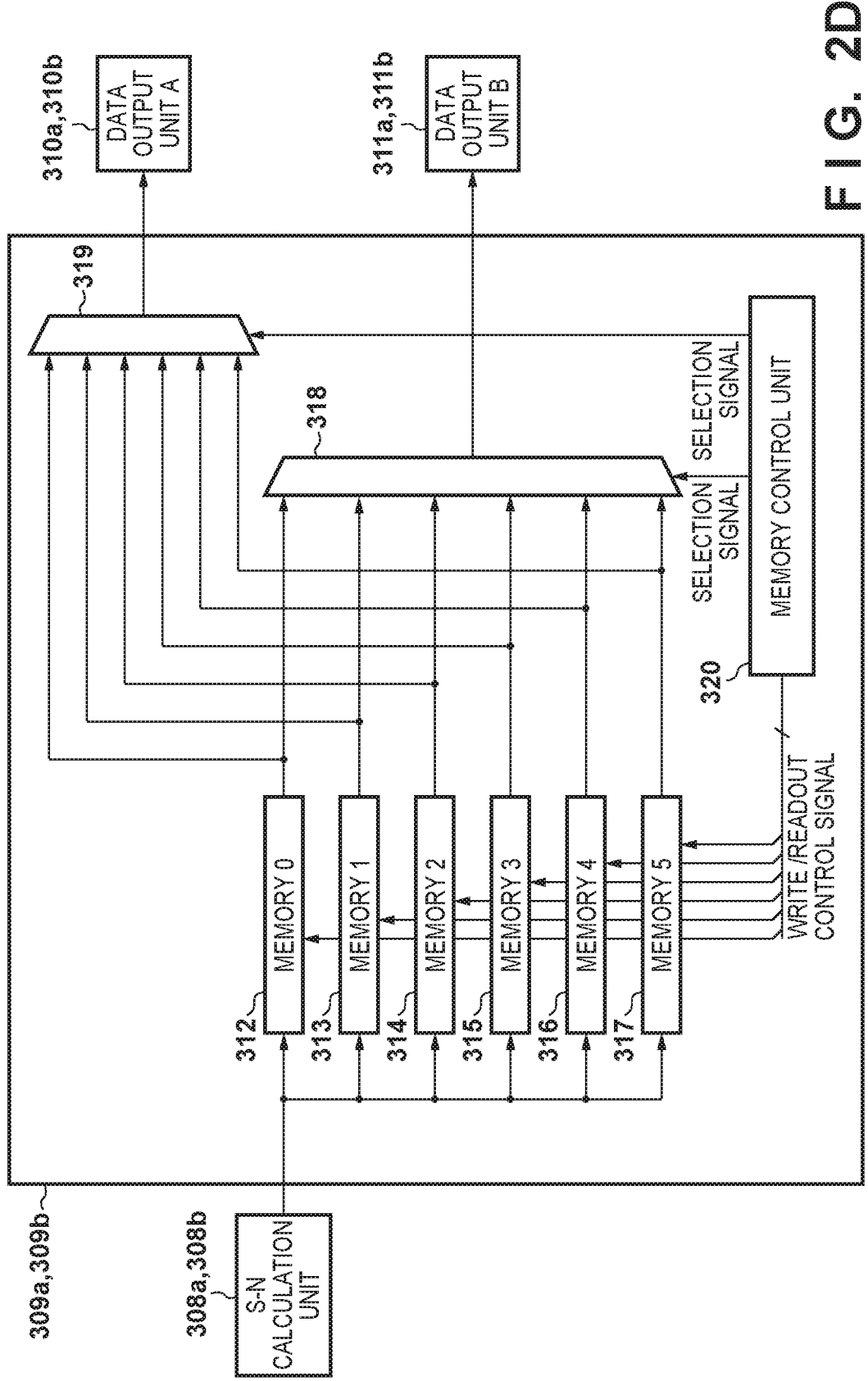
FIG. 2D is a diagram illustrating a configuration of an imaging element in the first embodiment.
Figure 2E:
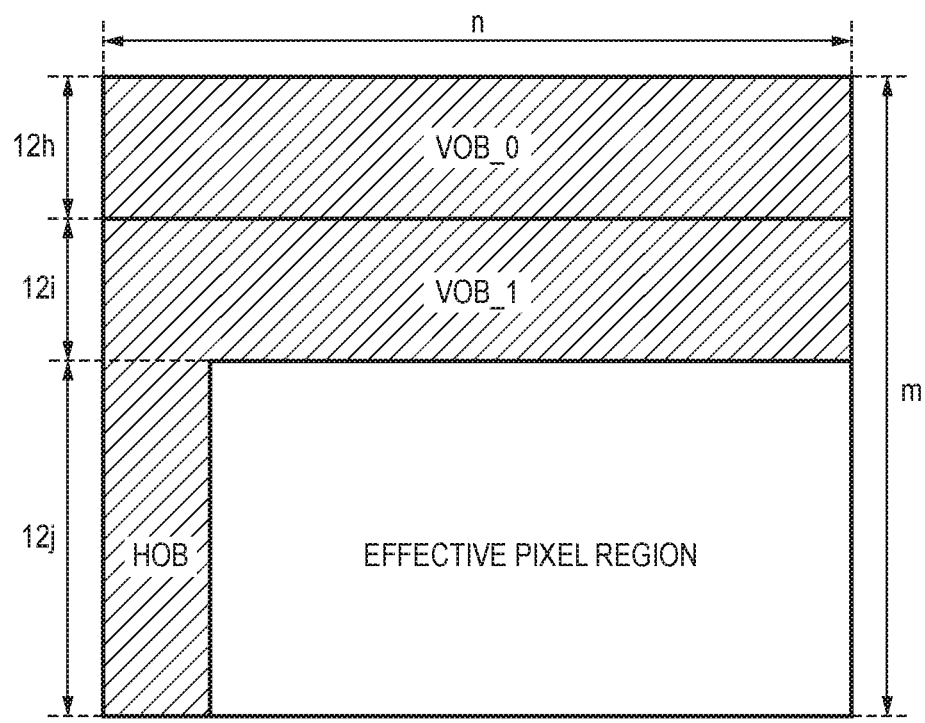
FIG. 2E is a diagram illustrating a configuration of an imaging element in the first embodiment.

FIG. 2A-1 to FIG. 2E are diagrams illustrating an example of circuit configurations of the imaging element 100. As illustrated in FIGS. 2A-1 and 2A-2, a plurality of pixels 200 each having a photoelectric converter are arranged in a matrix as pixels R0_0 to Bm-1_$n$-1 (m and n are arbitrary integers). R, G, or B indicated in the pixels 200 mean that a red, green, or blue color filter is respectively arranged for the pixel. In addition, R(G, B)p_q represents a pixel in the p-th row and the q-th column in a pixel section 210.

Here, the configuration of each pixel of the pixels 200 will be described with reference to FIG. 2B. A photodiode (PD) 201 photoelectrically converts an incident light signal, and accumulates electric charge corresponding to an exposure amount. When a control signal tx is set to a high level, a transfer gate 202 is turned on (conductive state), and electric charge accumulated in the PD 201 is transferred to a floating diffusion unit (FD unit) 203. The FD unit 203 is connected to the gate of an amplifier MOS transistor 204. The amplifier MOS transistor 204 outputs a voltage signal corresponding to the amount of charge transferred from the PD 201 to the FD unit 203.

A reset switch 205 is a switch for resetting the charge of the FD unit 203 and the PD 201. When a control signal res is set to a high level, the reset switch 205 is turned on (conductive state), and the FD unit 203 is reset. When the PD 201 charge is reset, the control signal tx and the control signal res are simultaneously set to a high level to turn on both the transfer gate 202 and the reset switch 205, and the PD 201 is reset via the FD unit 203.

The pixel selection switches 206a to 206c are turned on (conductive state) by setting the control signals sel0 to sel2 to a high level, respectively, and the amplifier MOS transistor 204 is connected to output terminals vout0 (207a) to vout2 (207c) of the pixel 200. As a result, the pixel signals converted into voltages by the amplifier MOS transistor 204 are outputted to the output terminals vout0 (207a) to vout2 (207c) of the pixel 200.

In the imaging element of the present embodiment, by control described later, one of sel0 to sel2 is turned on for each row according to a drive condition, and a pixel signal is output from one of the output terminals vout0 (207a) to vout2 (207c).

Referring back to FIGS. 2A-1 and 2A-2, a vertical scanning circuit 303 supplies control signals res, tx, sel0 to sel2, and the like to each pixel 200. These control signals are supplied to the terminals res, tx, and sel0 to sel2 of the pixels 200, respectively. The output terminals vout0 (207a) to vout2 (207c) of the pixels are connected to the column output lines 300a to 300l. As an example of a column in which a pixel R0_0 is arranged (column 0), as illustrated in FIGS. 2A-1 and 2A-2, a pattern of connections between pixels from the pixel R0_0 in the 0th row to a pixel G11_0 in the 11th row and column output lines 300a to 300l is repeated for the pixels in the 12th and subsequent rows. This connection pattern is similar in each column.

Column output lines 300a to 300l are connected to the inputs of AD converters (ADCs) 301a-301l, respectively. The AD converters 301a to 301l perform analog-digital conversion on an optical signal and a noise signal outputted from the pixel 200. Current sources 302a to 302l are connected to the column output lines 300a to 300l, respectively. A source follower circuit is configured by the amplifier MOS transistor 204 of the pixel 200 connected to the current sources 302a to 302l and the column output lines 300a to 300l.

The configuration of the AD converter is illustrated in FIG. 2C giving the AD converter 301a as an example. The AD converter 301a includes a comparator 327, a Latch_N 328, a Latch_S 329, and switches 330 and 331. A signal output from the column output line 300a is input to the comparator 327. A ramp signal A and a ramp signal B are output from a ramp signal generator 306a via a signal line 321a and a signal line 322a, and a ramp signal selected by a selector 326 is input to the comparator 327.

The selector 326 is controlled by a control signal outputted from a TG 307a illustrated in FIGS. 2A-1 and 2A-2, and which ramp signal is to be used is selected for each A/D converter. That is, the ramp signal A is selected when the corresponding AD converter is used for AD conversion of an image signal, and the ramp signal B is selected when the AD converter is used for AD conversion of a correction data signal.

A Latch_N 328 is a storage element for holding a noise level (N signal), and a Latch_S 329 is a storage element for holding a signal level (S signal). A counter value output from a counter 305a via the signal line 323a is input to the Latch_N 328 and the Latch_S 329.

The Latch_N 328 holds the counter value when the inverted output is input from the comparator 327 as the digital signal value of the N signal, and the Latch_S 329 holds the counter value when the inverted output is input from the comparator 327 as the digital signal value of the S signal.

The N signal held in the Latch_N 328 and the S signal held in the Latch_S 329 are output to a S-N calculation unit 308a illustrated in FIGS. 2A-1 and 2A-2 through the switches 330 and 331 and common output lines 324a and 325a, respectively.

The switches 330 and 331 are controlled by a control signal from a horizontal scanning circuit 304a. The output of a digital signal to S-N calculation unit 308a or 308b is sequentially performed for each AD converter, and is referred to as horizontal transfer.

The S-N calculation units 308a and 308b subtract the N signal from the input S signal. By this operation, image data in which a noise component caused by a column circuit has been canceled or correction data for generating a correction value is generated.

Data output from the S-N calculation units 308a and 308b is input to data distribution units 309a and 309b. The data distribution units 309a and 309b perform data distribution, rearrangement, and the like, and output the data to data output units 310a and 310b or data output units 311a and 311b.

FIG. 2D illustrates a configuration of the data distribution units 309a and 309b. The inputted data is written into the memory 0 (312) to the memory 5 (317) for each AD converter in accordance with a writing control signal outputted from the memory control unit 320. Taking the column in which the pixel R0_0 is arranged as an example, the data AD-converted in the AD converters 301a to 301f is written into the memory 0 (312) to the memory 5 (317) included in the data distribution unit 309a, respectively. Also, the data AD-converted by the AD converters 301g to 301l is written respectively into the memory 0 (312) to the memory 5 (317) included in the data distribution unit 309b.

The memory control unit 320 controls the read out of data from selectors 318 and 319 and the memory 0 (312) to the memory 5 (317). That is, data is sequentially output to the data output units 310a and 310b or the data output units 311a and 311b for each memory. The data output units 310a and 310b or the data output units 311a and 311b output data to the outside of the imaging element 100 by a transmission method such as SINS (Scalable Low Voltage Signaling).

Here, a configuration of the pixel region in the imaging element 100 will be described with reference to FIG. 2E. As illustrated in FIG. 2E, there are light-shielded pixel regions VOB_0, VOB_1, and HOB in which a plurality of light-shielded pixels are arranged, and an effective pixel region in which a plurality of effective pixels for capturing a subject are arranged. Pixels of n columns in the horizontal direction (row direction) and m rows in the vertical direction (column direction) are arranged.

In the vertical direction (column direction), pixels of 12h (h is an integer greater than 0) rows in the light-shielded pixel region VOB_0, 12i (is an integer greater than 0) rows in the light-shielded pixel region VOB_1, and 12j (j is integer greater than 0) rows in the effective pixel region are arranged respectively. In the vertical direction, since the pixel-column output line connection pattern of the 0th to 11th rows illustrated in FIGS. 2A-1 and 2A-2 is repeated, each region is a multiple of 12 rows.

The light-shielded pixel region VOB_0 is used at the time of reading correction data, which will be described later, and the light-shielded pixel regions VOB_1 and HOB, and the effective image region are used at the time of reading image data. A vertical scanning operation for reading respective signals from light-shielded pixel regions VOB_0, VOB_1, HOB, and the effective image region, and the control signals sel0 to sel2 for determining electric connections of the pixel-column output lines are independently controlled by the vertical scanning circuit 303.

Figure 3:
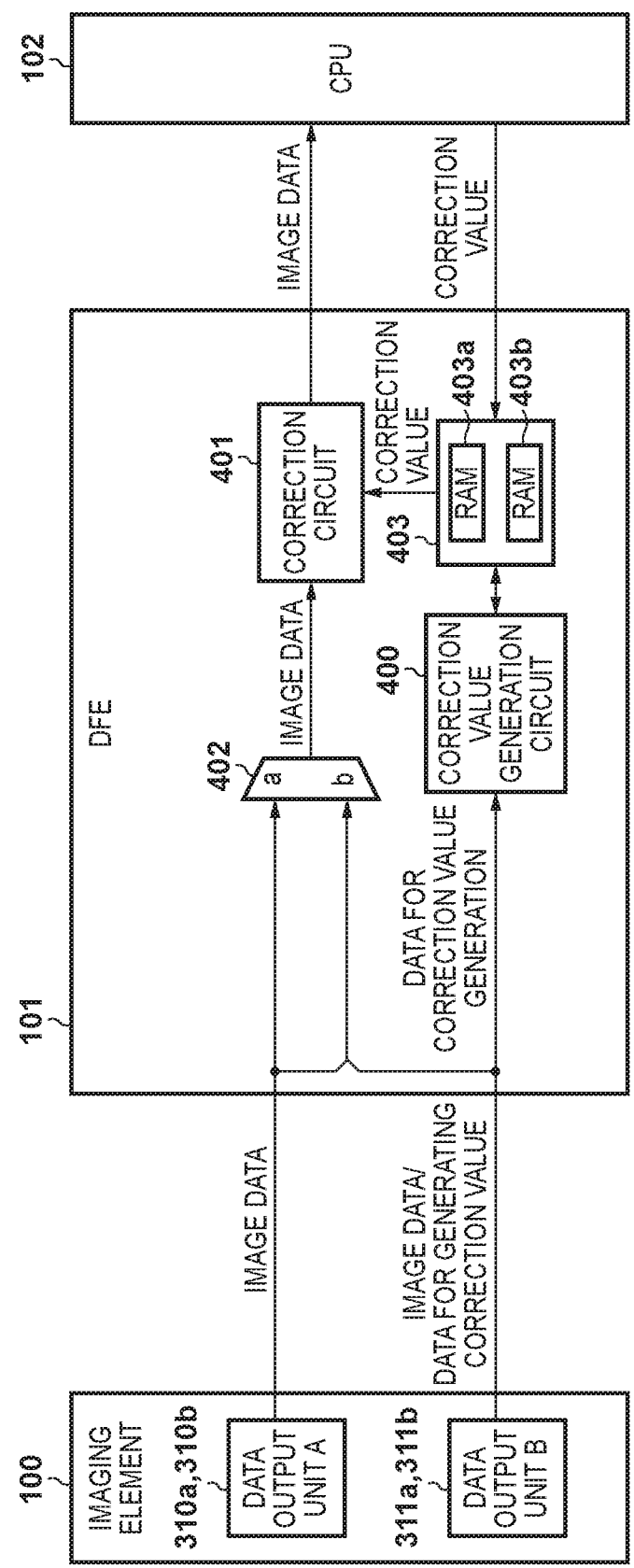
FIG. 3 is a diagram illustrating a configuration of a DFE in the first embodiment.

Next, a configuration of the DFE 101 will be described with reference to FIG. 3. FIG. 3 illustrates a configuration of the DFE 101 including connections to the imaging element 100 and the CPU 102. Data output from data output units 310a and 310b is input to a selector 402. Meanwhile, data output from data output units 311a and 311b is input to a correction value generation circuit 400. The data output from the data output units 310a and 310b and the data output from the data output units 311a and 311b are combined as one frame of image data and input to the selector 402. The selector 402 is controlled based on settings set from the CPU 102 for each capturing mode. Output of the selector 402 is input to a correction circuit 401.

The correction value generation circuit 400 generates a correction value for each column circuit (column output line, A/D converter, etc.) from the data output from the data output units 311a and 311b, and stores the correction value in a RAM 403. The RAM 403 has a RAM 403a and a RAM 403b. An image correction value is stored in one of the RAMs and used for correction. With the RAM that is not being used for the correction, correction value generation and holding is performed, or it is powered down. The RAM 403a or the RAM 403b has a function of writing a correction value transmitted from the CPU 102.

The correction circuit 401 subtracts a correction value outputted from the RAM 403 for each column circuit from image data, and performs offset correction. Thereafter, the data is outputted to the CPU 102.

Figure 4:
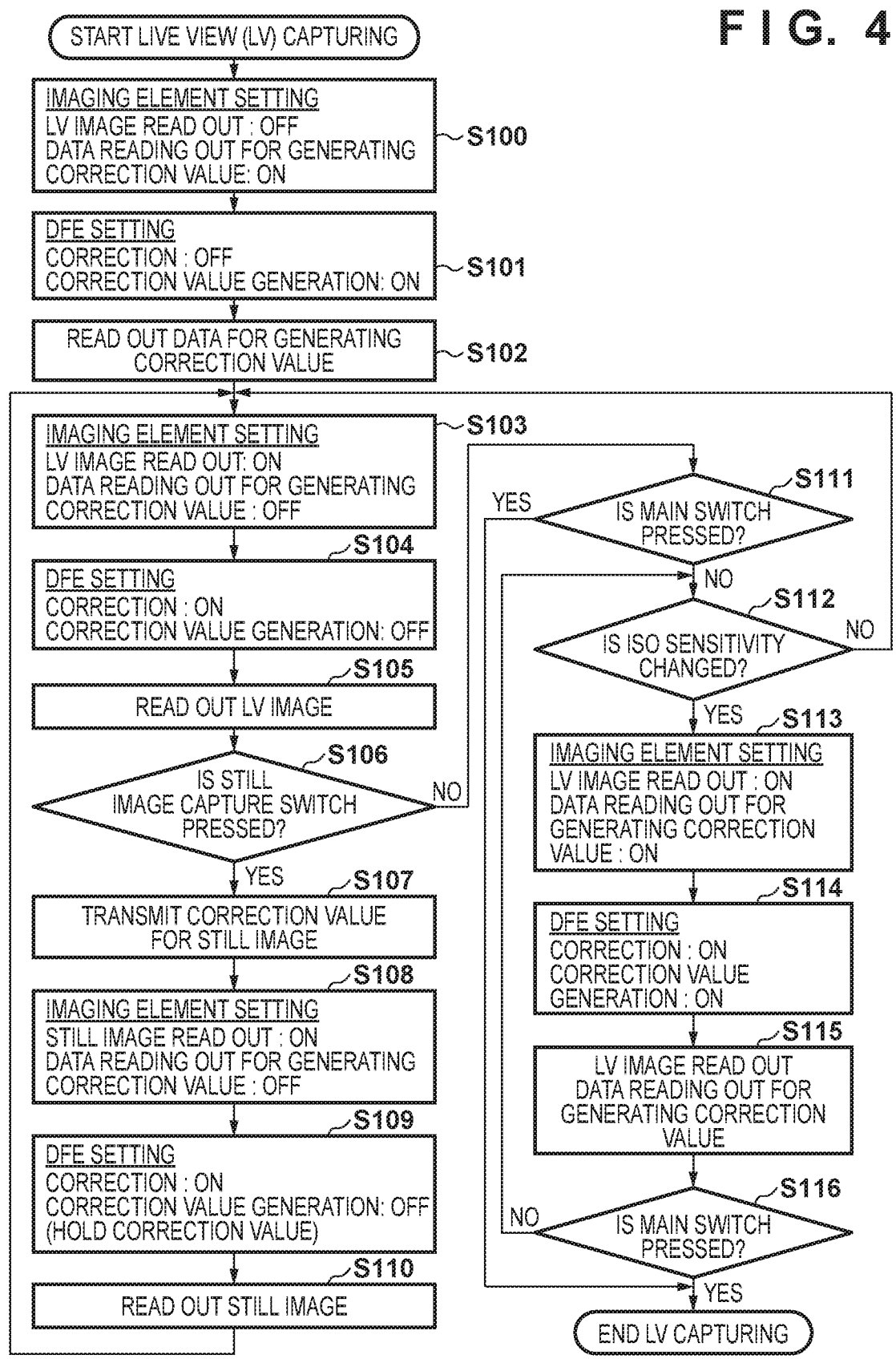
FIG. 4 is a flowchart illustrating operation of the image capturing apparatus according to the first embodiment.

Next, the operation of the image capturing apparatus according to the first embodiment will be described. FIG. 4 is a flowchart for explaining a capturing operation of the image capturing apparatus 100 according to the first embodiment. In the following description, only an R pixel will be described as an example. Since the operations of G pixels and the B pixels are the similar to those of R pixels, the description thereof is omitted.

When the user presses a main switch of the operation unit 103 illustrated in FIG. 1, live view (LV) capturing is started. When LV capturing is started, in step S100, the CPU 102 sets the imaging element 100 to read out correction data for correcting LV image data. The CPU 102 sets a pulse for the control signals res, tx, sel0 to sel2 and the like of the light-shielded region VOB_0 to the vertical scanning circuit 303.

Further, as an inclination of a ramp signal B generated by the ramp signal generator 306a, an inclination (e.g., an inclination for capturing with the image capturing sensitivity ISO 200) at the time of reading out the correction data is set. In addition, the setting is made such that the AD converters 301d and 301b are turned on and other AD converters (301a, 301c, 301e, and 301f) are turned off with respect to a TG 307a.

The selector 326 of the AD converters 301d and 301b is set to select the ramp signal B. In addition, setting is made such that the data output unit 310a is turned off and the data output unit 311a is turned on. In the present embodiment, the circuit after being turned off has a configuration in which power consumption is lower than that at a time when it is turned on.

Next, in step S101, the DFE 101 is set. Here, setting for generating a correction value is performed. The correction value generation circuit 400 is set to generate a correction value. In addition, the RAM used for generating the correction value is set to the RAM 403a in the RAM 403.

Next, in step S102, the correction data is read out. A conceptual diagram illustrating a state of each component at this time is illustrated in frame No. LV_0 of FIG. 5.

Operation of the imaging element 100 at a time of reading out the correction data (during the output period) will be described with reference to FIG. 6A.

At time ta0, control signals tx_0, tx_2, tx_4, tx_6, tx_8, tx_10 become H, and the transfer switch 202 is turned on. At that time, the control signals res_0, res_2, res_4, res_6, res_8, and res_10 of the reset switch 205 are H. Charge accumulated in the photodiode 201 is transferred to a power source 208 via the transfer switch 202 and the reset switch 205, and the photodiode 201 is reset.

At time ta1, control signals tx_0, tx_2, tx_4, tx_6, tx_8, and tx_10 are set to L, and accumulation of charge in the photodiodes 201 is started.

At time ta2 after accumulation of charge for a predetermined time, control signals sel1_0, sel_2, sel_4, sel_6, sel_8, and sel_10 of the selection switches 206 become H, and the source of the amplifier MOS transistor 204 is connected to the column output lines.

At time ta3, the control signals res_0, res_2, res_4, res_6, res_8, and res_10 of the reset switch 205 are set to L, thereby releasing the reset of the FD unit 203. At this time, a potential of a reset signal level corresponding to a potential of the FD unit 203 is output to the column output lines 300b and 300d via the amplifier MOS transistor 204, and is input to the AD converters 301b and 301d.

Figure 7A:
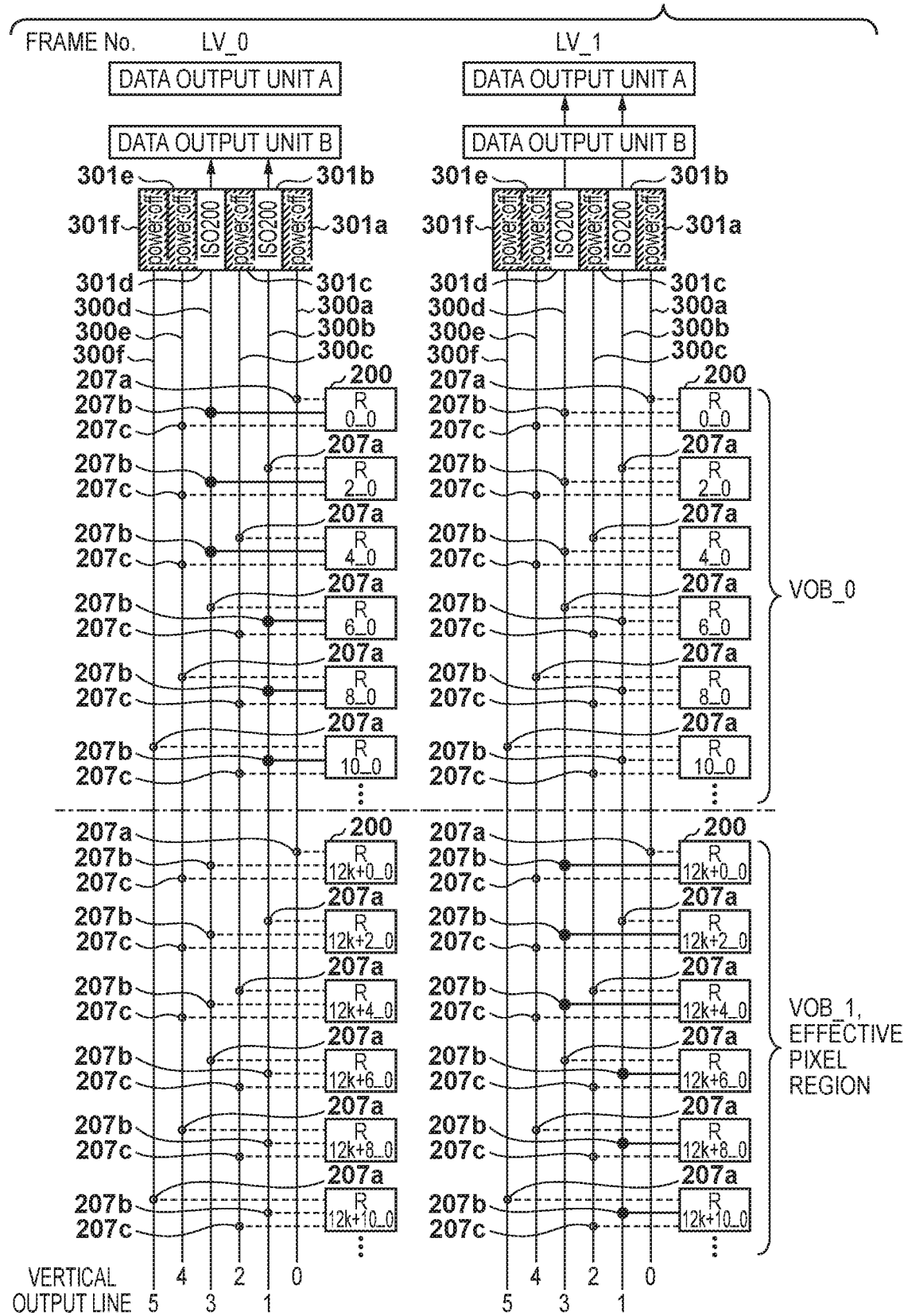
FIGS. 7A-7C are diagrams illustrating a concept regarding operation of the imaging element in the first embodiment.
Figure 7B:
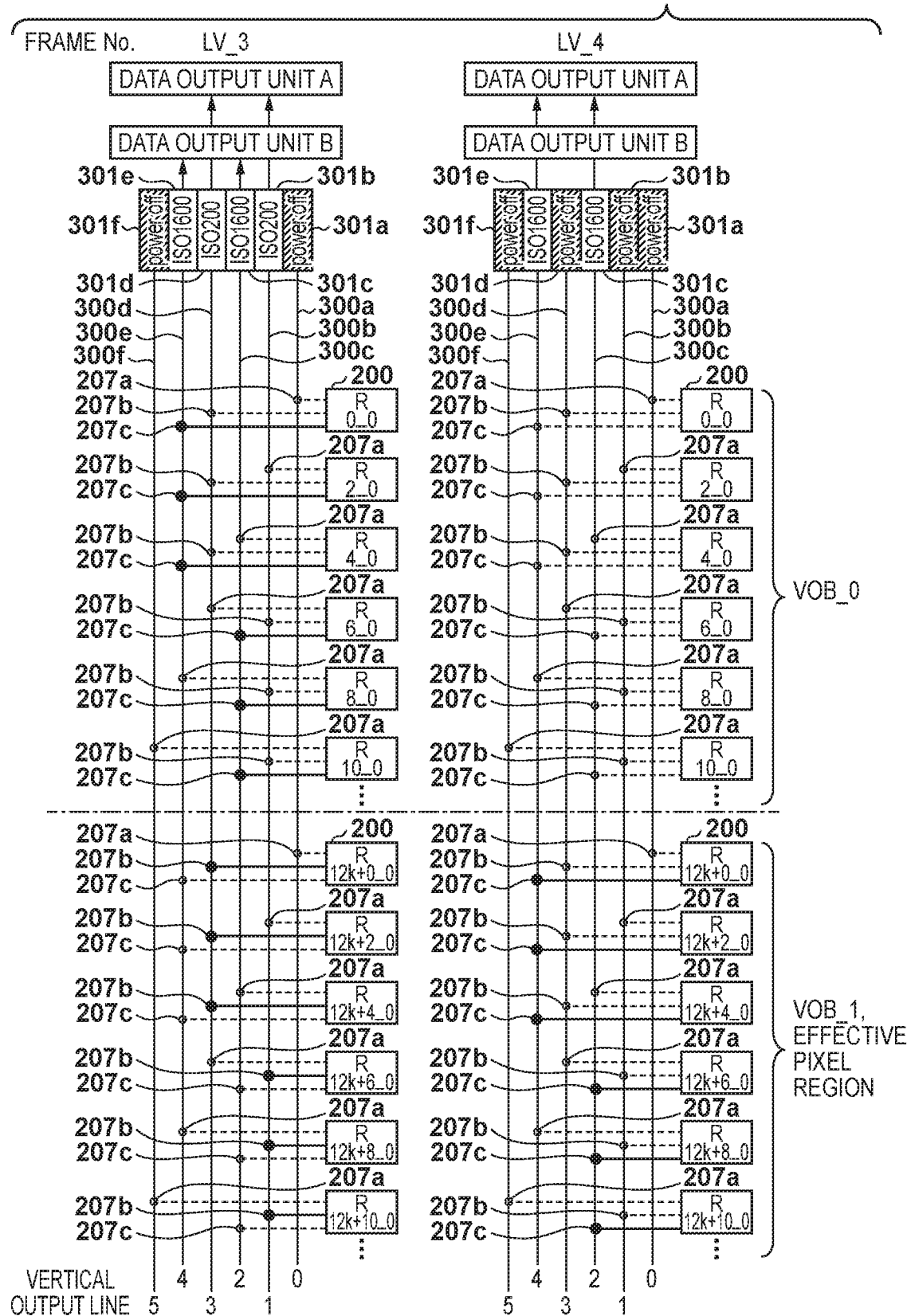
Figure 7C:
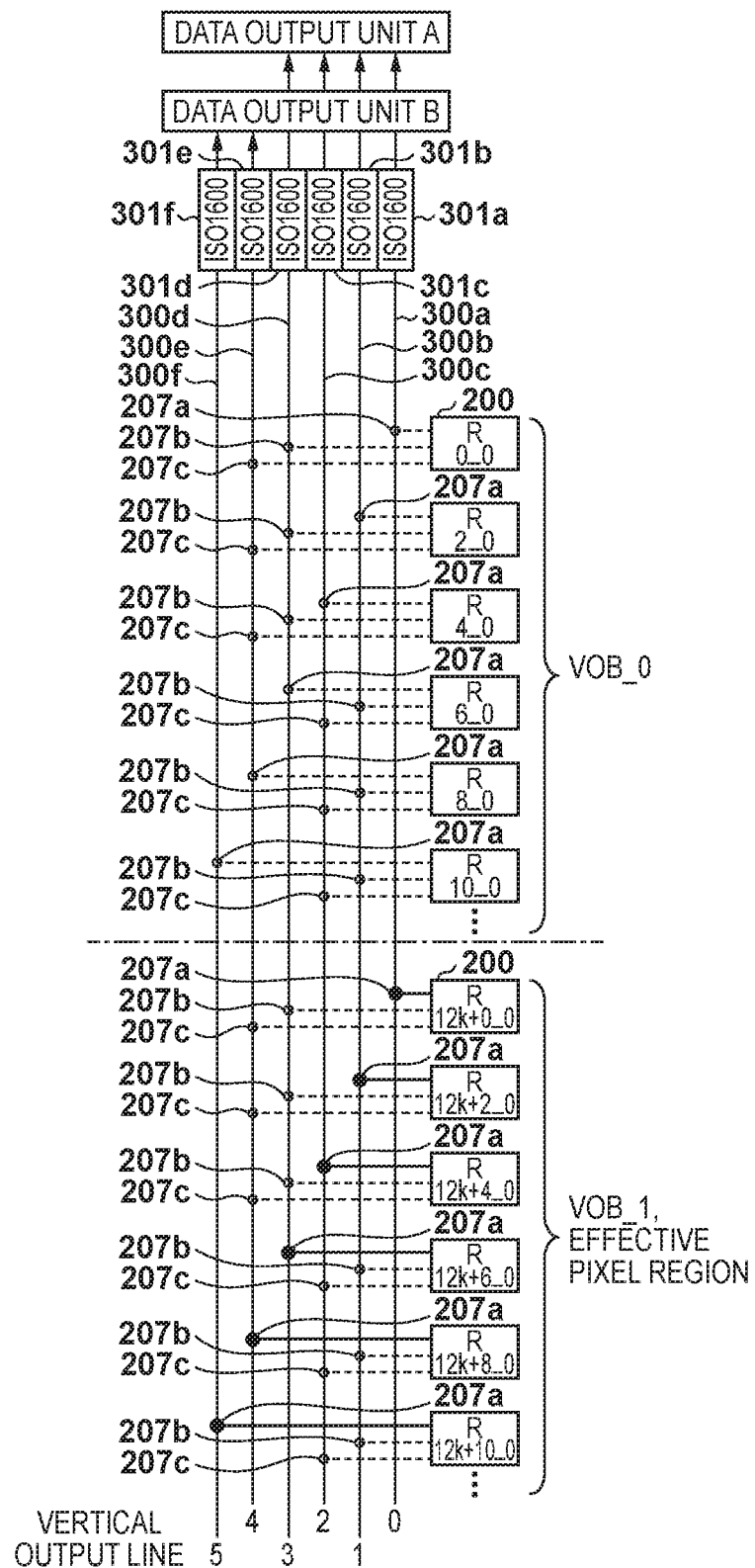

FIGS. 7A to 7C are conceptual diagrams illustrating connection between pixels and column output lines at this time. As illustrated in frame No. LV_0, the 0th, 2nd, and 4th rows are connected to the column output line 300d (column output line 3), and the 6th, 8th, and 10th rows are connected to the column output line 300b (column output line 1). The pixel signals connected to the same column output line are combined (added) and AD-converted in the AD converter.

Note that in FIGS. 7A to 7C, the control signal sel is L for a connection line from a pixel to a column output line is indicated by a broken line, such a connection line is not connected to the column output line. In the following description, column output lines 300a to 300f will be referred to as column output lines 0 to 5, respectively, for convenience.

Noise levels are output to an output terminal vout1 of a respective pixel 200, signals in which a noise level is combined (added) of pixels in the 6th, 8th, and 10th rows are outputted to the column output line 300b, and signals in which a noise level is combined of pixels in the 0th, 2nd, and 4th rows are outputted to the column output line 300d.

Next, at time ta4, the TG 307a drives the AD converters 301b and 301d and starts the AD conversion. Here, signals in which the noise level outputted to the respective column output line are combined are AD-converted. The counter 305a starts the operation of incrementing the count value at the same time as the AD conversion is started. The comparator 327 compares the signal level of the column output lines 300b and 301d with the ramp signal level outputted from the selector 326, and stores the counter value at the coincident time point in the Latch_N 328, and thereby the AD conversion is performed.

At time ta5, when the AD conversion is completed, the AD converters 301b and 301d hold the AD-converted noise levels, respectively.

Next, at time ta6, the TG 307a once again drives the AD converters 301b and 301d and starts the AD conversion. That is, signals in which the noise levels outputted to the respective column output line are combined are AD-converted. At time ta7, when the AD conversion is completed, the AD converters 301b and 301d hold the AD-converted noise levels, respectively.

The time (timing) from the state where the reset is released by setting res_0, res_2, res_4, res_6, res_8, and res_10 to L is different for the noise level held here and the initial noise level. In the present embodiment, the difference between the noise levels acquired twice in relation to this time is set as a correction target as a unique column offset noise for each column circuit (column output line, AD converter, or the like).

Thereafter, at time tab, the control signals res_0, res_2, res_4, res_6, res_8, and res_10 are set to H, and the FD unit 203 is reset, in addition, data output to the outside of the imaging element 100 is started. The horizontal scanning circuit 304 starts horizontal scanning, and sequentially transfers the first N signals and the second N signals of the AD converters 301b and 301d of each column to the S-N calculation unit 308a.

The S-N calculation unit 308a subtracts the N signal of the first time from the N signal of the second time for each column, and outputs data from the data output unit 311a via the data distribution unit 309a.

When the control signals sel_0, sel_2, sel_4, sel_6, sel_8, and sel_10 become L at time ta9 and then the data output of all the columns is completed at time ta10, one transfer unit of the data output is completed.

Figure 6A:
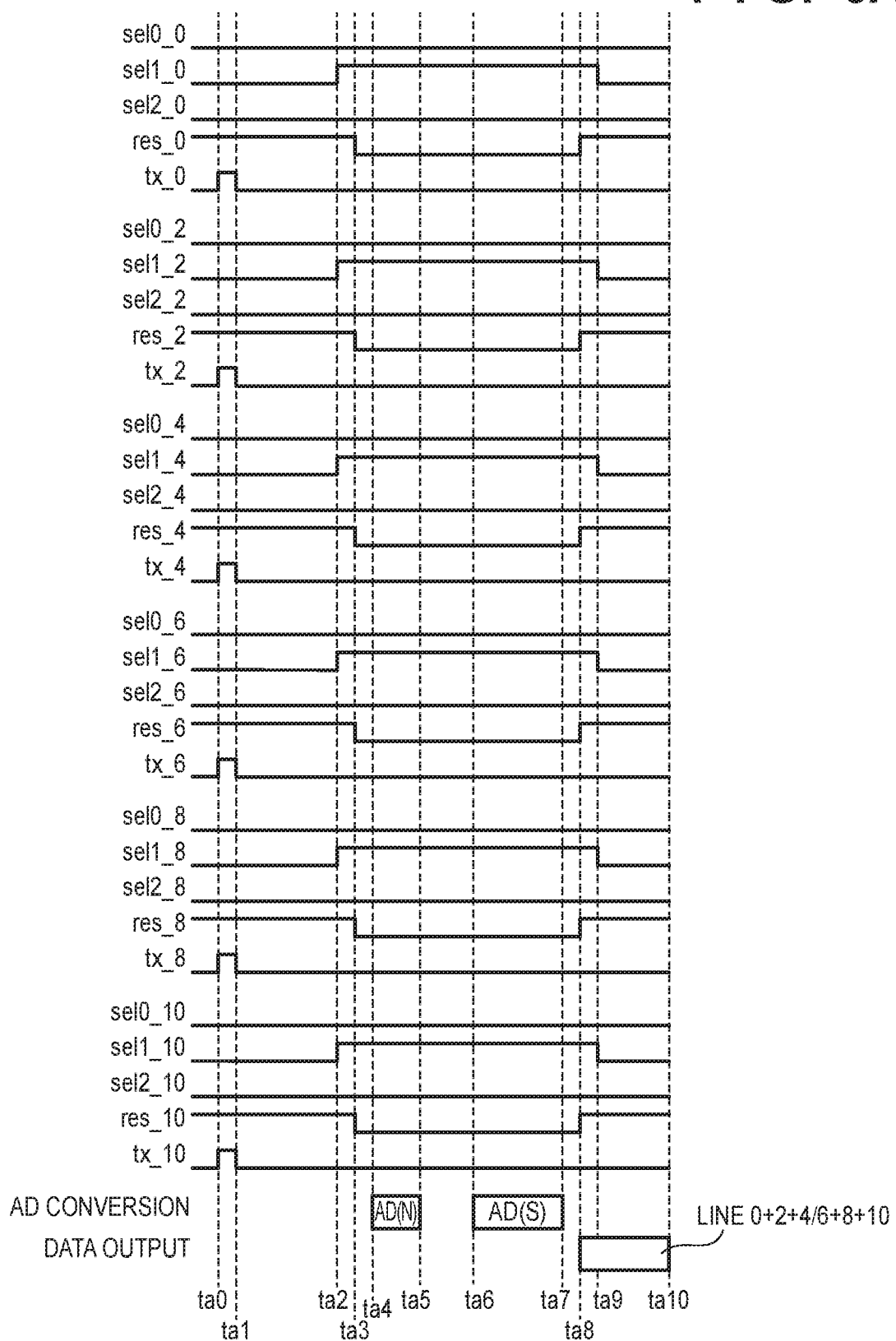
FIG. 6A is a timing chart illustrating operation of an imaging element in the first embodiment.
Figure 8A:
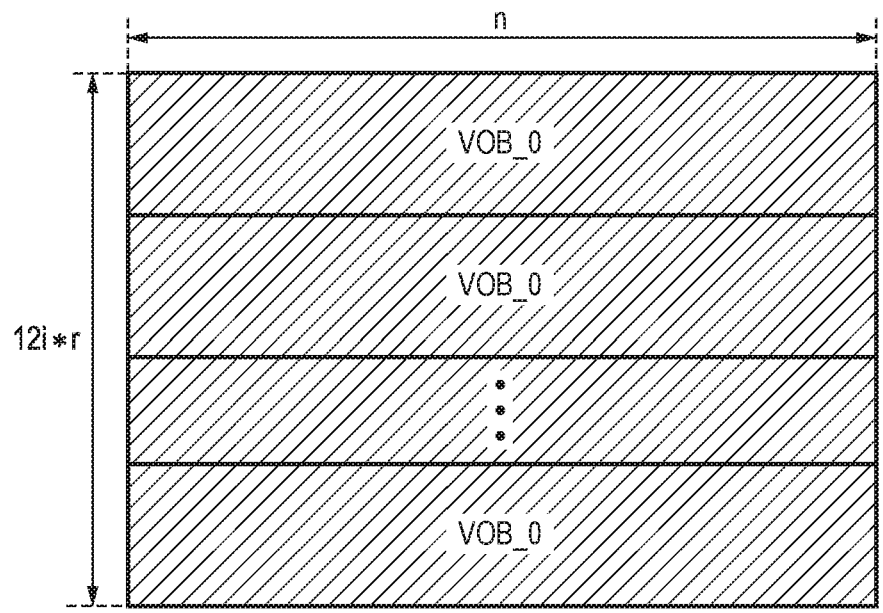
FIGS. 8A and 8B are diagrams illustrating a concept regarding operation of an imaging element in the first embodiment.

In the present embodiment, correction data is outputted by repeating the correction data reading operation illustrated in FIG. 6A for a predetermined number of times with respect to the light-shielded pixel region VOB_0 as illustrated in FIG. 8A.

Next, the operation of the DFE 101 in step S102 (LV_0 frame in FIG. 5) will be described.

The correction data is outputted from the data output unit 311a of the imaging element 100 and inputted to the correction value generation circuit 400. As illustrated in FIG. 9, to the correction value generation circuit 400, data is sequentially input via column output lines 300b and 300d (column output lines 1 and 3), respectively.

The correction value generation circuit 400 adds up data for each column of the column output lines while temporarily storing the data in the RAM 403a. After a predetermined number of rows are added, the values are averaged and stored in the RAM 403a as a correction value. When the generation of the correction value is completed in the DFE 101, the process proceeds to step S103.

In step S103, the CPU 102 sets the imaging element 100 to read out LV image data. The CPU 102 sets a pulse for the control signals res, tx, sel0 to sel2 and the like of the light-shielded pixel region VOB_1 and the effective pixel region to the vertical scanning circuit 303.

Further, as an inclination of a ramp signal A generated by the ramp signal generator 306a, an inclination (e.g., an inclination for capturing with the image capturing sensitivity ISO 200) at the time of reading out the LV image data is set. In addition, the setting is made such that the AD converters 301d and 301b are turned on and the other AD converters (301a, 301c, 301e, and 301f) are turned off with respect to the TG 307a.

The selector 326 of the AD converters 301d and 301b is set to select the ramp signal A. In addition, the setting is made such that the data output unit 311a is turned off and the data output unit 310a is turned on.

Next, in step S104, the DFE 101 is set. Here, setting for correcting LV image data is performed. The selector 402 is set to a, and only the data from the data output unit 310a is selected. In addition, the RAM used for the correction is set to the RAM 403a in the RAM 403.

Next, in step S105, the LV image data is read out. A conceptual diagram illustrating a state of each component at this time is illustrated in frame No. LV_1 of FIG. 5.

Operation of the imaging element 100 at a time of reading out the LV image data (during the output period) will be described with reference to FIG. 10A.

At time tc0, the control signals tx-12k+0, 12k+2, 12k+4, 12k+6, 12k+8, and 12k+10 (k is an integer greater than h) become H, and the transfer switch 202 is turned on. At this time, res_12k+0, res_12k+2, res_12k+4, res_12k+6, res_12k+8, and res_12k+10 are H. Charge accumulated in the photodiode 201 is transferred to a power source 208 via the transfer switch 202 and the reset switch 205, and the photodiode 201 is reset.

At time tc1, the control signals tx_12k+0, tx_12k+2, tx_12k+4, tx_12k+6, tx_12k+8, and tx_12k+10 are set to L, and the accumulation of photoelectric charge in the photodiode 201 is started.

At time tc2 after the accumulation of the photoelectric charge for a predetermined time, the control signals sel1_12k+0, sel1_12k+2, sel1_12k+4, sel1_12k+6, sel1_12k+8, and sel_12k+10 of the selection switches 206 become H. The source of the amplifier MOS transistor 204 is connected to the column output line.

At the time tc3, the reset of the FD unit 203 is released by setting the control signals res_12k+0, res_12k+2, res_12k+4, res_12k+6, res_12k+8, and res_12k+10 of the reset switch 205 to L. At this time, a potential of a reset signal level corresponding to a potential of the FD unit 203 is output to the column output lines 300b and 300d (column output lines 1 and 3) via the amplifier MOS transistor 204, and is input to the AD converters 301b and 301d.

FIGS. 7A to 7C are conceptual diagrams illustrating connection between pixels and column output lines at this time. As illustrated in frame No. LV_1, the 12k+0, 12k+2, and 12k+4 rows are connected to the column output line 300d (column output line 3), and the 12k+6, 12k+8, and 12k+10 rows are connected to the column output line 300b (column output line 1). The pixel signals connected to the same column output line are combined (added) and AD-converted in the AD converter.

Noise levels are output to an output terminal vout1 of a respective pixel 200, signals in which a noise level is combined (added) of pixels in the 6th, 8th, and 10th rows are outputted to the column output line 300b, and signals in which a noise level is combined of pixels in the 0th, 2nd, and 4th rows are outputted to the column output line 300d.

Next, at time tc4, the TG 307a drives the AD converters 301b and 301d and starts the AD conversion. Here, signals in which the noise levels outputted to the respective column output lines are combined are AD-converted. The counter 305a starts the operation of incrementing the count value at the same time as the AD conversion is started. The comparator 327 compares the signal level of the column output lines 300b and 300d with the ramp signal level outputted from the selector 326, and stores the counter value at the coincident time point in the Latch_N 328, and thereby the AD conversion is performed.

At time tc5, when the AD conversion is completed, the AD converters 301b and 301d hold the AD-converted noise levels, respectively.

At time tc6, the vertical scanning circuit 303 sets the control signals tx_12k+0, tx_12k+2, tx_12k+4, tx_12k+6, tx_12k+8, and tx_12k+10 to H. Accordingly, the transfer gates 202 of the pixels 200 in the 12k+0th, 12k+2th, 12k+4th, 12k+6th, 12k+8th, 12k+10th rows are turned on.

The signal charge (photoelectric charge) accumulated in the PD 201 of the respective pixel is transferred to the gate of the source follower formed by the amplifier MOS transistor 204. The potential of the source follower fluctuates from a reset level by an amount corresponding to the transferred signal charge, and thereby the signal level is determined.

At this time, a signal level is outputted to the output terminal vout1 of a respective pixel 200, and a signal in which the signal levels of the pixels in the 12k+0th, 12k+2th, 12k+4th rows are combined (added) is outputted to the column output line 300d. Further, a signal in which the signal levels of the pixels in the 12k+6th, 12k+8th, and 12k+10th rows are combined is output to the column output line 300b.

After this, at time tc7, the control signals tx_12k+0, tx_12k+2, tx_12k+4, tx_12k+6, tx_12k+8, and tx_12k+10 are set to L, and the transfer from the PD 201 is completed.

Next, at time tc8, the TG 307a drives the AD converters 301b and 301d and starts the AD conversion. That is, signals in which the signal levels outputted to the respective column output line are combined are AD-converted. At time tc9, when the AD conversion is completed, the AD converters 301b and 301d hold the AD-converted signal levels, respectively.

After this, at time tc10, the control signals res_12k+0, res_12k+2, res_12k+4, res_12k+6, res_12k+8, and res_12k+10 are set to H, and once again the FD unit 203 is put into a reset state. In addition, data output to the outside of the imaging element 100 is started. The horizontal scanning circuit 304 starts horizontal scanning, and sequentially transfers N signals and S signals of the AD converters 301b and 301d of each column to the S-N calculation unit 308a.

The S-N calculation unit 308a subtracts the N signal from the S signal for each column, and outputs data from the data output unit 310a via the data distribution unit 309a.

At time tc11, the control signals sel1_12k+0, sel1_12k+2, sel1_12k+4, sel1_12k+6, sel1_12k+8, and sel1_12k+10 become L. Thereafter, when data output of all columns ends at time tc12, one unit of transfer for data output ends.

Figure 8B:
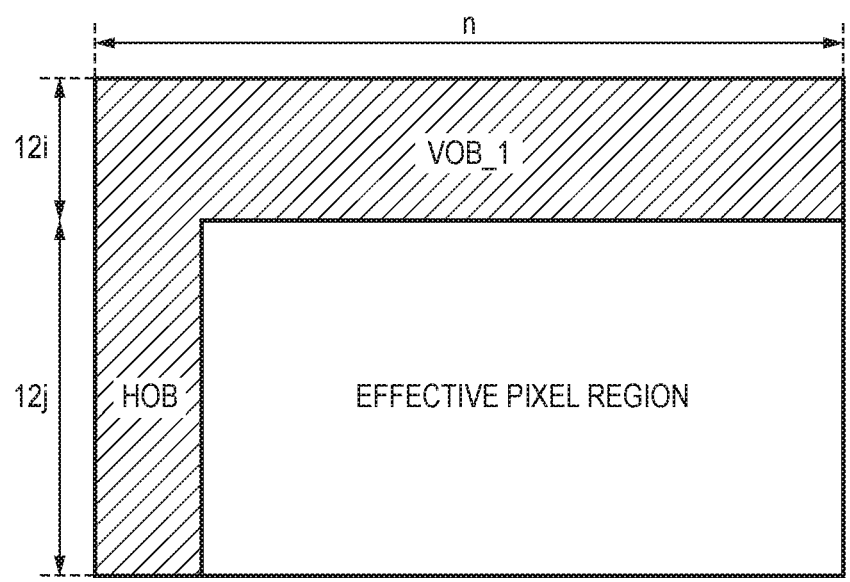
Figure 10A:
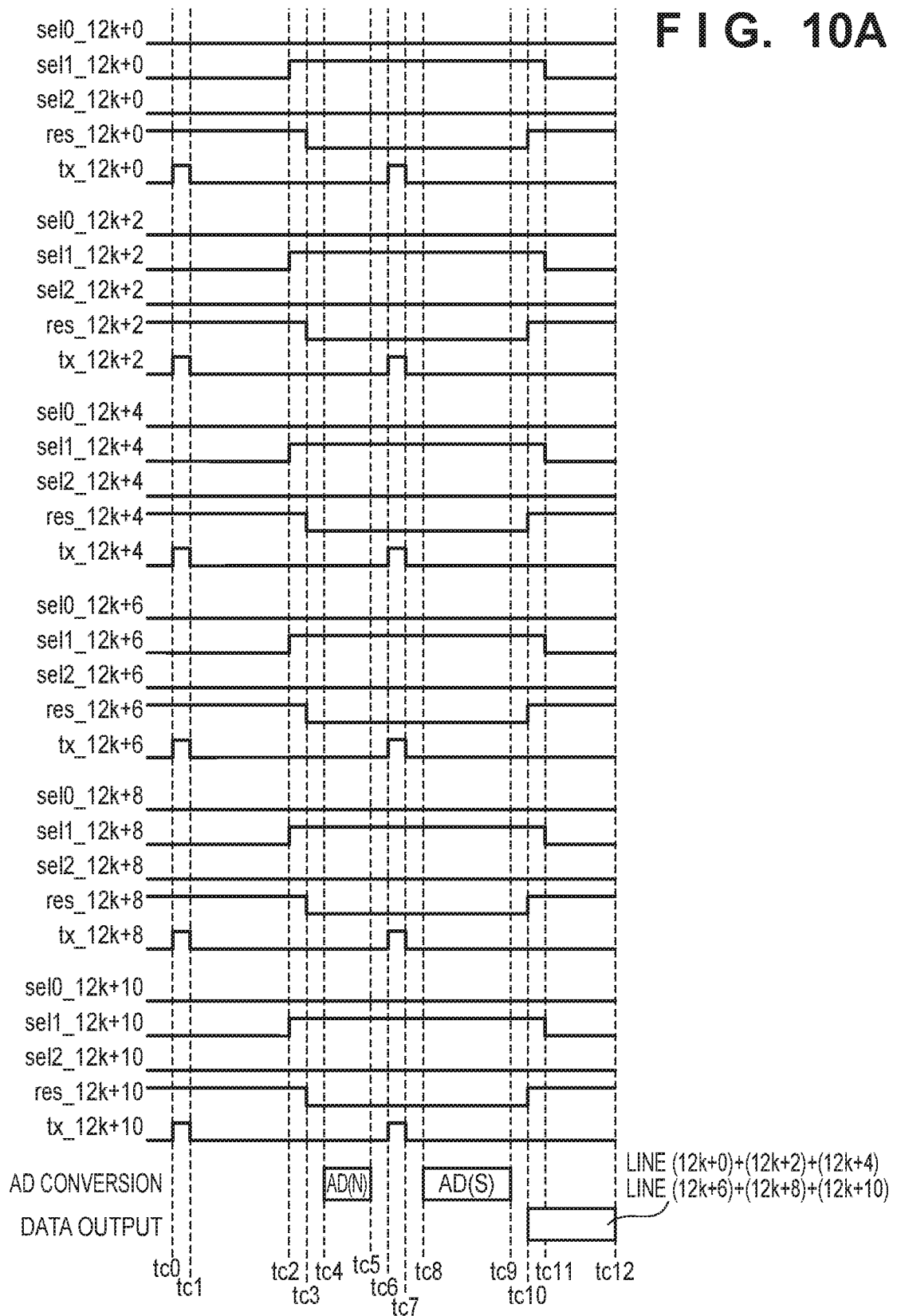
FIG. 10A is a timing chart illustrating operation of an imaging element in the first embodiment.

In the present embodiment, the LV image data reading operation illustrated in FIG. 10A is performed on the light-shielded pixel region VOB_1 and the effective pixel region in the vertical direction (column direction) as illustrated in FIG. 8B, and the signals of three pixels are combined in the vertical direction to output the LV image data.

Next, the operation of the DFE 101 in step S105 (LV_1 frame in FIG. 5) will be described.

The LV image data is output from the data output unit 310a of the imaging element 100 and input to the correction circuit 401. As illustrated in FIG. 11, to the correction circuit 401, image data is sequentially input via column output lines 300b and 300d (column output lines 1 and 3), respectively.

The correction circuit 401 receives a correction value stored in the RAM 403a at a time corresponding to a column of inputted image data, and subtracts the correction value from the image data for each column of the column output lines. Thereafter, the image data is outputted to the CPU 102.

The CPU 102 transfers the inputted LV image data to the image processing unit 107, develops the LV image data in a development circuit (not illustrated) in the image processing unit 107, and starts display as a live-view image on the display unit 104.

Thereafter, in step S106, the CPU 102 determines whether or not the still image capture switch of the operation unit 103 is pressed. If the still image capture switch is not pressed (NO in step S106), the process proceeds to step S111.

In step S111, the CPU 102 determines whether or not the main switch has been pressed, and if the main switch has been pressed (YES in step S111), ends capturing. If the main switch has not been pressed (NO in step S111), the process proceeds to step S112.

In step S112, the CPU 102 determines whether to change the ISO sensitivity in the following frame. In the present embodiment, it is assumed that the user operates the operation unit 103 to change the ISO sensitivity, and if the ISO sensitivity is not changed (NO in step S112), the process returns to step S103. If the ISO sensitivity is changed (YES in step S112), the processing advances to step S113.

In the present embodiment, configuration is such that the ISO sensitivity is determined by the user, but the present invention is not limited thereto. It is also possible to adopt a configuration in which the brightness is detected from the captured LV image, and the CPU 102 automatically changes the ISO sensitivity based on a predetermined determination.

In step S113, the CPU 102 sets the imaging element 100 to read out correction data for correcting LV image data. The CPU 102 sets a pulse for the control signals res, tx, sel0 to sel2 and the like of the light-shielded pixel region VOB_0 to the vertical scanning circuit 303.

Further, as an inclination of a ramp signal B generated by the ramp signal generator 306a, an inclination (e.g., an inclination for capturing with the image capturing sensitivity ISO 1600) at the time of reading out the correction data is set.

The CPU 102 sets a pulse for the control signals res, tx, sel0 to sel2 and the like of the light-shielded pixel region VOB_1 and the effective pixel region to the vertical scanning circuit 303.

Further, as an inclination of the ramp signal A generated by the ramp signal generator 306a, an inclination (e.g., an inclination for capturing with the image capturing sensitivity ISO 200) at the time of reading out the LV image data is set. In addition, setting is made such that the AD converters 301b, 301c, 301d, and 301e are turned on and the other AD converters (301a and 301f) are turned off with respect to the TG 307a. Also, the selector 326 of the AD converters 301b and 301d is set to select the ramp signal A. The selector 326 of the AD converters 301c and 301e is set to select the ramp signal B. In addition, the setting is made such that the data output unit 310a and the data output unit 311a are turned on.

Next, in step S114, the DFE 101 is set. Here, setting for generating a correction value is performed. The correction value generation circuit 400 is set to generate a correction value. In addition, the RAM used for generating the correction value is set to RAM 403b in the RAM 403.

Also, setting for correcting LV image data is performed. The selector 402 is set to a, and only the data from the data output unit 310a is selected. In addition, the RAM used for the correction is set to RAM 403a in the RAM 403.

Next, in step S115, correction data read out and LV image data read out is performed. A conceptual diagram illustrating a state of each component at this time is illustrated in frame No. LV_3 of FIG. 5.

Figure 6B:
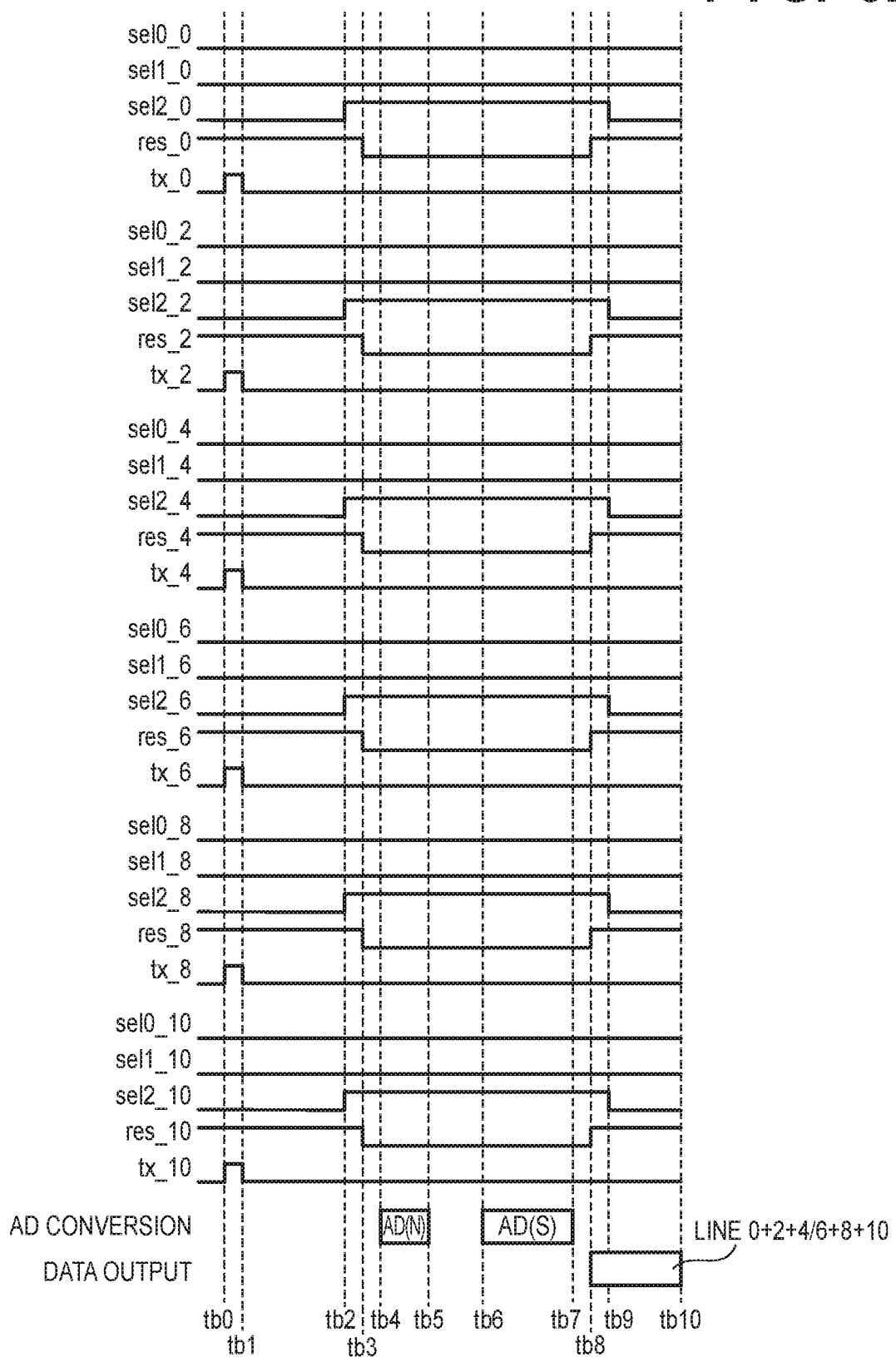
FIG. 6B is a timing chart illustrating operation of an imaging element in the first embodiment.

The operation of the imaging element 100 in reading the correction data at this time is illustrated in FIG. 6B. The operation differs from the operation at the time of correction data readout in the above-described FIG. 6A in that it drives the control signals sel2_0, sel2_2, sel2_4, sel2_6, sel2_8, sel2_10; since the rest is the same as in FIG. 6A, description thereof is omitted.

A conceptual diagram illustrating connection between pixels and column output lines at this time will be described using FIGS. 7A to 7C once again. As illustrated in frame No. LV_3, the 0th, 2nd, and 4th rows are connected to the column output line 300e (column output line 4), and the 6th, 8th, and 10th rows are connected to the column output line 300c (column output line 2). The pixel signals connected to the same column output line are combined (added) and then AD-converted in the AD converter.

At the same time, LV image data is read out. Since the readout of the LV image data at this time is similar to that in FIG. 10A described above, the description thereof is omitted.

Next, the operation of the DFE 101 in step S115 (LV_3 frame in FIG. 5) will be described. In this frame, the reading periods of the image data and the correction data overlap.

The correction data is outputted from the data output unit 311a of the imaging element 100 and input to the correction value generation circuit 400. To the correction value generation circuit 400, correction data is sequentially input via column output lines 300b and 300d (column output lines 2 and 4), respectively.

For each column of the column output lines, the correction value generation circuit 400 adds up the correction data while temporarily storing the correction data in the RAM 403a. After the adding has been performed for a predetermined number of rows, the values are averaged and the average is stored in the RAM 403a as the correction value.

Since the correction of the LV image is similar to the operation of the above-described step S105, description thereof will be omitted. When the generation of the correction value and the correction of the LV image is completed in the DFE 101, the process proceeds to step S116.

In step S116, the CPU 102 determines whether or not the main switch has been pressed, and if the main switch has been pressed (YES in step S116), ends capturing. If the main switch has not been pressed (NO in step S116), the process proceeds to step S112. If it is determined in step S112 that the ISO sensitivity is not changed again, the process proceeds to step S103.

In step S103, the CPU 102 sets the imaging element 100 to read out LV image data. The CPU 102 sets a pulse for the control signals res, tx, sel0 to sel2 and the like of the light-shielded pixel region VOB_1 and the effective pixel region to the vertical scanning circuit 303.

Further, as an inclination of the ramp signal A generated by the ramp signal generator 306a, an inclination (e.g., an inclination for capturing with the image capturing sensitivity ISO 1600) at the time of reading out the LV image data is set. In addition, setting is made such that the AD converters 301e, 301c are turned on and the other AD converters (301a, 301b, 301d, and 301f) are turned off with respect to the TG 307a.

Also, the selector 326 of the AD converters 301e and 301c is set to select the ramp signal A. In addition, setting is made such that the data output unit 311a is turned off and the data output unit 310a is turned on.

Next, in step S104, the DFE 101 is set. Here, setting for correcting LV image data is performed. The selector 402 is set to a, and only the image data from the data output unit 310a is selected. In addition, the RAM used for the correction is set to RAM 403a in the RAM 403.

Next, in step S105, the LV image data is read out. A conceptual diagram illustrating a state of each component at this time is illustrated in frame No. LV_4 of FIG. 5.

Figure 10B:
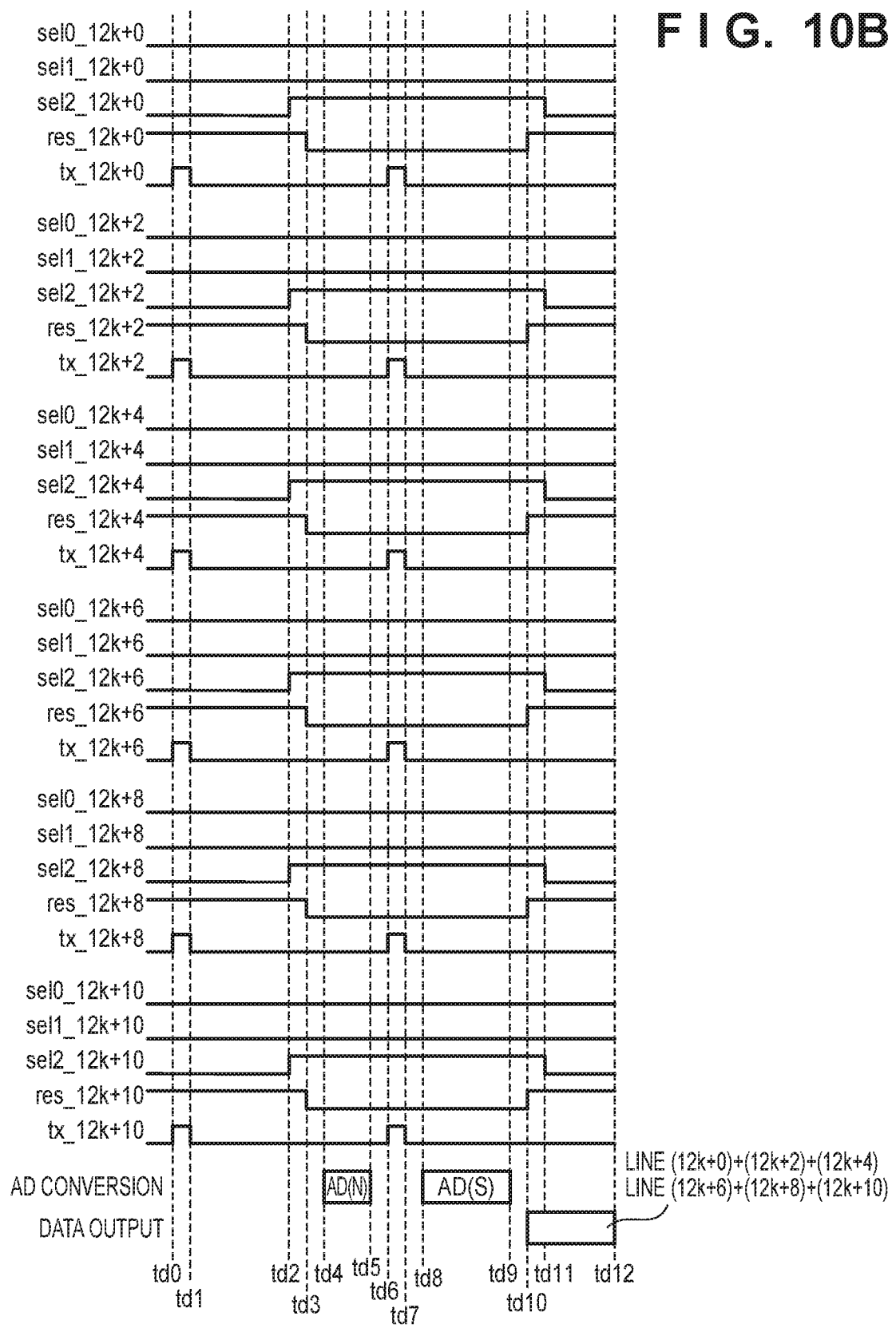
FIG. 10B is a timing chart illustrating operation of an imaging element in the first embodiment.

The operation of the imaging element 100 in reading the correction data at this time is illustrated in FIG. 10B. What differs from the above-described operation at the time of reading the correction data of FIG. 6A is that the control signals sel2_12k+0, sel2_12k+2, sel2_12k+4, sel2_12k+6, sel2_12k+8, and sel2_12k+10 are driven; other points are similar to FIG. 10A, and therefore description thereof is omitted.

A conceptual diagram illustrating connection between pixels and column output lines at this time will be described using FIGS. 7A to 7C once again. As illustrated in frame No. LV_4, the 12k+0, 12k+2, and 12k+4 rows are connected to the column output line 300e (column output line 4), and the 12k+6, 12k+8, and 12k+10 rows are connected to the column output line 300c (column output line 2). The pixel signals connected to the same column output line are combined (added) and then AD-converted in the AD converter.

Next, the operation of the DFE 101 in step S105 (LV_4 frame in FIG. 5) will be described.

The LV image data is outputted from the data output unit 310a of the imaging element 100 and input to the correction circuit 401. As illustrated in FIG. 11, to the correction circuit 401, image data is sequentially input via column output lines 300c and 300e (column output lines 2 and 4), respectively.

The correction circuit 401 receives a correction value stored in the RAM 403b at a time corresponding to a column of inputted image data, and subtracts the correction value from the image data for each column of the column output lines. Thereafter, the image data is outputted to the CPU 102.

The CPU 102 transfers the inputted LV image data to the image processing unit 107, develops the LV image data in a development circuit (not illustrated) in the image processing unit 107, and starts operation for display as a live-view image on the display unit 104.

Thereafter, the process proceeds to step S106. If the still image capture switch is pressed in step S106 (YES in step S106), the process proceeds to step S107.

In step S107, the CPU 102 transmits the still image correction data to the DFE 101. Here, it is assumed that still image capturing is performed at ISO 1600. The CPU 102 transmits to the RAM 403 of the DFE 101 a correction value that is stored in the ROM 106 and correspond to the ISO 1600 for each column of the column output lines 300a to 300f (column output lines 0 to 5). Here, the correction value is written in the RAM 403a that is not being used for correction of the LV image data. A conceptual diagram illustrating a state of each component at this time is illustrated in frame No. LV_5 of FIG. 5. Thereafter, the process proceeds to step S108.

In step S108, the CPU 102 sets the imaging element 100 to read out the still image data. The CPU 102 sets a pulse for the control signals res, tx, sel0 to sel2 and the like of the light-shielded pixel region VOB_1 and the effective pixel region to the vertical scanning circuit 303.

Further, as an inclination of the ramp signal A generated by the ramp signal generator 306a, an inclination (e.g., an inclination for capturing with the image capturing sensitivity ISO 1600) at the time of reading out the still image data is set. Further, the AD converters 301a to 301f are set to be turned on with respect to the TG 307a.

Also, the selector 326 of the AD converters 301a to 301f is set to select the ramp signal A. In addition, the setting is made such that the data output unit 310a and the data output unit 311a are turned on.

Next, in step S109, the DFE 101 is set. Here, setting for correcting the still image data is performed. The selector 402 is set to b, and the data from the data output unit 310a and the data output unit 311a is selected. In addition, the RAM used for the correction is set to RAM 403a for the RAM 403. In addition, setting for holding the correction values stored in the RAM 403b is performed.

Next, in step S110, the still image data is read out. A conceptual diagram illustrating a state of each component at this time is illustrated in frame No. STILL IMAGE of FIG. 5.

Operation of the imaging element 100 in reading out the still image data will be described with reference to FIG. 10C.

At time te0, the control signals tx_12k+0, tx_12k+2, 12k+4, tx_12k+6, tx_12k+8, and tx_12k+10 are set to H, and the transfer switch 202 becomes on. At this time, res_12k+0, res_12k+2, res_12k+4, res_12k+6, res_12k+8, and res_12k+10 are H. Charge accumulated in the photodiode 201 is transferred to a power source 208 via the transfer switch 202 and the reset switch 205, and the photodiode 201 is reset.

At time te1, the control signals tx_12k+0, tx_12k+2, tx_12k+4, tx_12k+6, tx_12k+8, and tx_12k+10 are set to L, and the accumulation of photoelectric charge in the photodiode 201 is started.

At time te2 after the accumulation of the photoelectric charge for a predetermined time, the control signals sel0_12k+0, sel0_12k+2, sel0_12k+4, sel0_12k+6, sel0_12k+8 and sel0_12k+10 of the selection switches 206 become H. The source of the amplifier MOS transistor 204 is connected to the column output line.

At the time te3, the reset of the FD unit 203 is released by setting the control signals res_12k+0, res_12k+2, res_12k+4, res_12k+6, res_12k+8, and res_12k+10 of the reset switch 205 to L. At this time, a potential of a reset signal level corresponding to a potential of the FD unit 203 is output to the column output lines 300a to 300f via the amplifier MOS transistor 204, and is input to the AD converters 301a to 301f.

A conceptual diagram illustrating connection between pixels and column output lines at this time will be described using FIGS. 7A to 7C once again. As illustrated in the frame No. STILL IMAGE, the 12k+0th, 12k+2th, 12k+4th, 12k+6th, 126k+8th, and 12k+10th rows are connected to the column output lines 300a to 300f (column output lines 0 to 5), respectively.

A noise level is output to the output terminal vout0 of each pixel 200, and noise levels of the pixels in the 12k+0th, 12k+2th, 12k+4th, 12k+6th, 12k+8th, and 12k+10th rows are output to the column output lines 300a to 300f.

Next, at time te4, the TG 307a drives the AD converters 301a to 301f and starts the AD conversion. Here, the noise level outputted to the respective column output line is AD-converted. The counter 305a starts the operation of incrementing the count value when the AD conversion is started. The comparator 327 compares the signal level of the column output lines 300a to 300f with the ramp signal level outputted from the selector 326, and stores the counter value at the coincident time point in the Latch_N 328, and thereby the AD conversion is performed.

At time te5, when the AD conversion is completed, the AD converters 301a to 301f hold the AD-converted noise levels, respectively.

At time te6, the vertical scanning circuit 303 sets the control signals tx_12k+0, tx_12k+2, tx_12k+4, tx_12k+6, tx_12k+8, and tx_12k+10 to H. Accordingly, the transfer gates 202 of the pixels 200 in the 12k+0th, 12k+2th, 12k+4th, 12k+6th, 12k+8th, 12k+10th row are turned on.

The signal charge (photoelectric charge) accumulated in the PD 201 of the respective pixel is transferred to the gate of the source follower formed by the amplifier MOS transistor 204. The potential of the source follower fluctuates from a reset level by an amount corresponding to the transferred signal charge, and thereby the signal level is determined.

At this time, the signal level is output to the output terminal vout0 of each pixel 200, and the signal levels of the pixels in the 12k+0th, 12k+2th, 12k+4th, 12k+6th, 12k+8th, and 12k+10th rows are output to the column output lines 300a to 300f.

After this, at time te7, the control signals tx_12k+0, tx_12k+2, tx_12k+4, tx_12k+6, tx_12k+8, and tx_12k10 are set to L, and the transfer from the PD 201 is completed.

Next, at time te8, the TG 307a drives the AD converters 301b and 301d and starts the AD conversion. That is, the signal level outputted to the respective column output line is AD-converted. At time te9, when the AD conversion is completed, the AD converters 301b and 301d hold the AD-converted signal levels, respectively.

After this, at time te10, res_12k+0, res_12k+2, res_12k+4, res_12k+6, res_12k+8, and res_12k+10 are set to H, and the FD unit 203 is put into the reset state once again. In addition, data output to the outside of the imaging element 100 is started. The horizontal scanning circuit 304 starts horizontal scanning, and sequentially transfers N signals and S signals of the AD converters 301b and 301d of each column to the S-N calculation unit 308a.

The S-N calculation unit 308a subtracts the N signal from the S signal for each column, and outputs the still image data from the data output unit 311a via the data distribution unit 309a.

At time te11, the control signals sel0_12k+0, sel0_12k+2, sel0_12k+4, sel0_12k+6, sel0_12k+8, and sel0_12k+10 become L. Thereafter, when data output of all columns ends at time te12, a single transfer unit for data output ends.

Figure 10C:
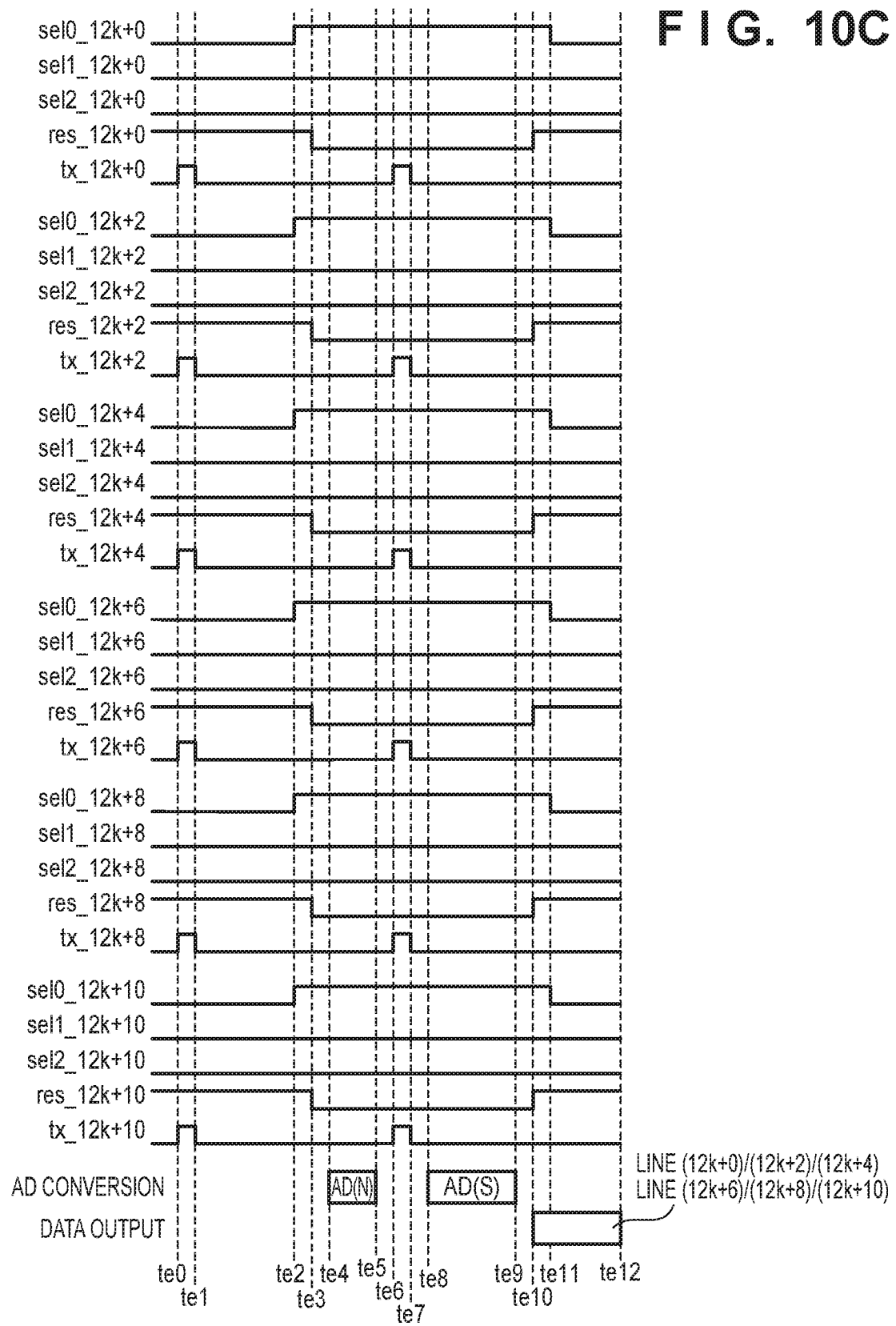
FIG. 10C is a timing chart illustrating operation of an imaging element in the first embodiment.

In the present embodiment, the still image data reading operation illustrated in FIG. 10C is performed on the light-shielded pixel region VOB_1 and the effective pixel region in the vertical direction (column direction) as illustrated in FIG. 8B, and thereby the still image data is outputted.

Next, the operation of the DFE 101 in step S110 (the still image frame in FIG. 5) will be described.

The still image data is outputted from the data output unit 310a and the data output unit 311a of the imaging element 100, and input to the correction circuit 401. To the correction circuit 401, still image data is sequentially input via column output lines 300b and 300d (column output lines 0 to 5), respectively.

The correction circuit 401 receives a correction value stored in the RAM 403a at a time corresponding to a column of inputted still image data, and subtracts the correction value from the still image data for each column of the column output lines. Thereafter, the still image data is outputted to the CPU 102.

The CPU 102 transfers the inputted still image data to the image processing unit 107, develops the still image data in a development circuit (not illustrated) in the image processing unit 107, and records the still image to the recording unit 108. When the still image capturing is completed, the process proceeds to step S103.

By the above operation, even when a capturing mode such as the ISO sensitivity is changed in the moving image capturing, a correction corresponding to the capturing mode can be applied to an image without loss of the moving image (LV image) frame. In addition, since the correction value is generated immediately before capturing, it is unnecessary to store the required correction values for each capturing mode.

In the present embodiment, the correction value is acquired when the gain of the AD converter is changed in relation to the ISO sensitivity, but the present invention is not limited thereto. For example, the present invention can be applied to a case where the gain of a built-in amplifier or the like is changed. In addition, the present invention can be applied to a case where a capturing mode such as the number of bits in AD conversion, the number of pixels combined in the vertical direction/horizontal direction, or the like is switched.

In the present embodiment, an offset correction is performed, but any correction originating in a column circuit, such as gain correction, is applicable.

Second Embodiment

Figure 12:
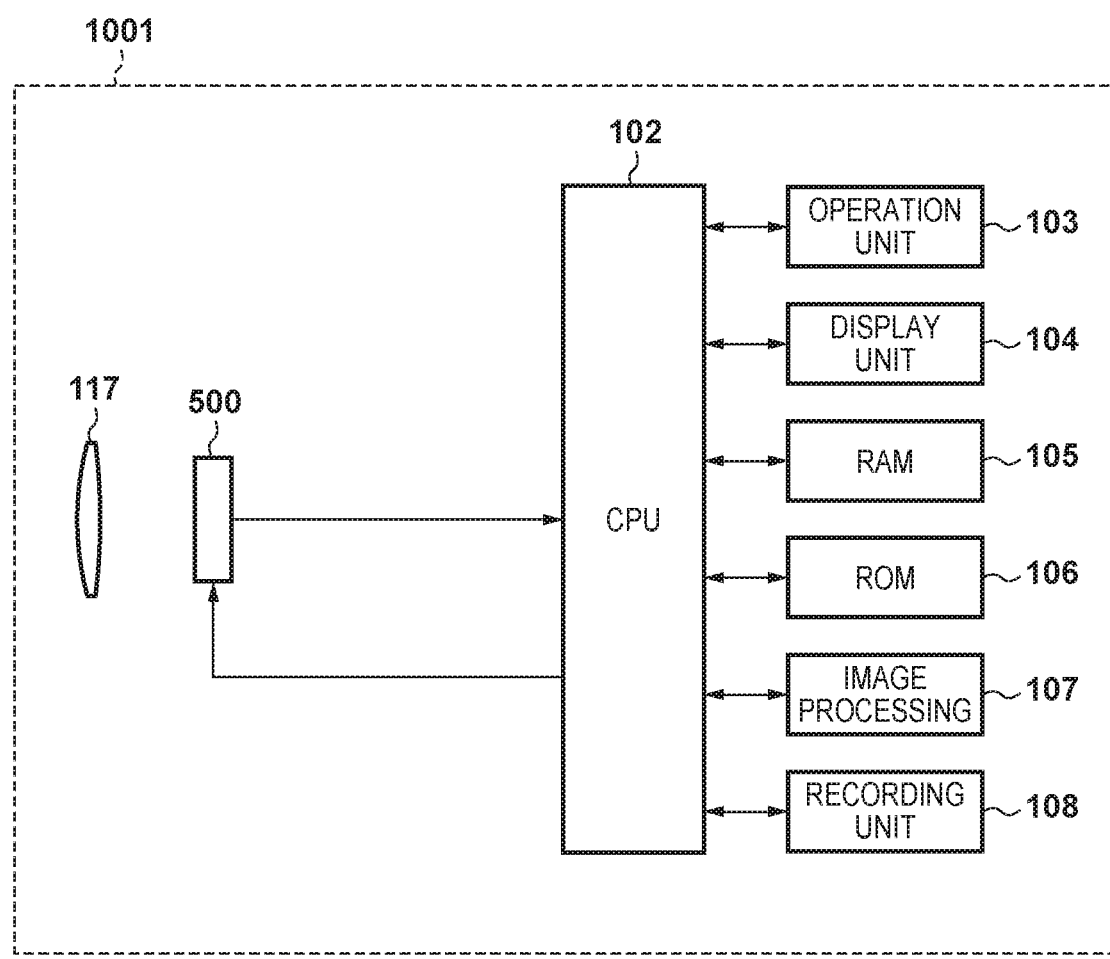
FIG. 12 is a diagram illustrating a configuration of an image capturing apparatus according to a second embodiment.

Hereinafter, an image capturing apparatus according to the second embodiment of the present invention will be described with reference to FIG. 12. FIG. 12 is a block diagram illustrating a configuration of an image capturing apparatus according to the present embodiment. An image capturing apparatus 1001 in the present embodiment includes an imaging element 500. Further, as compared with the image capturing apparatus 1000 described in the first embodiment, data is transmitted from the imaging element 500 directly to the CPU 102 without having the DFE 101. The rest is similar to in the image capturing apparatus 1000, and therefore description thereof is omitted.

Figure 13A:
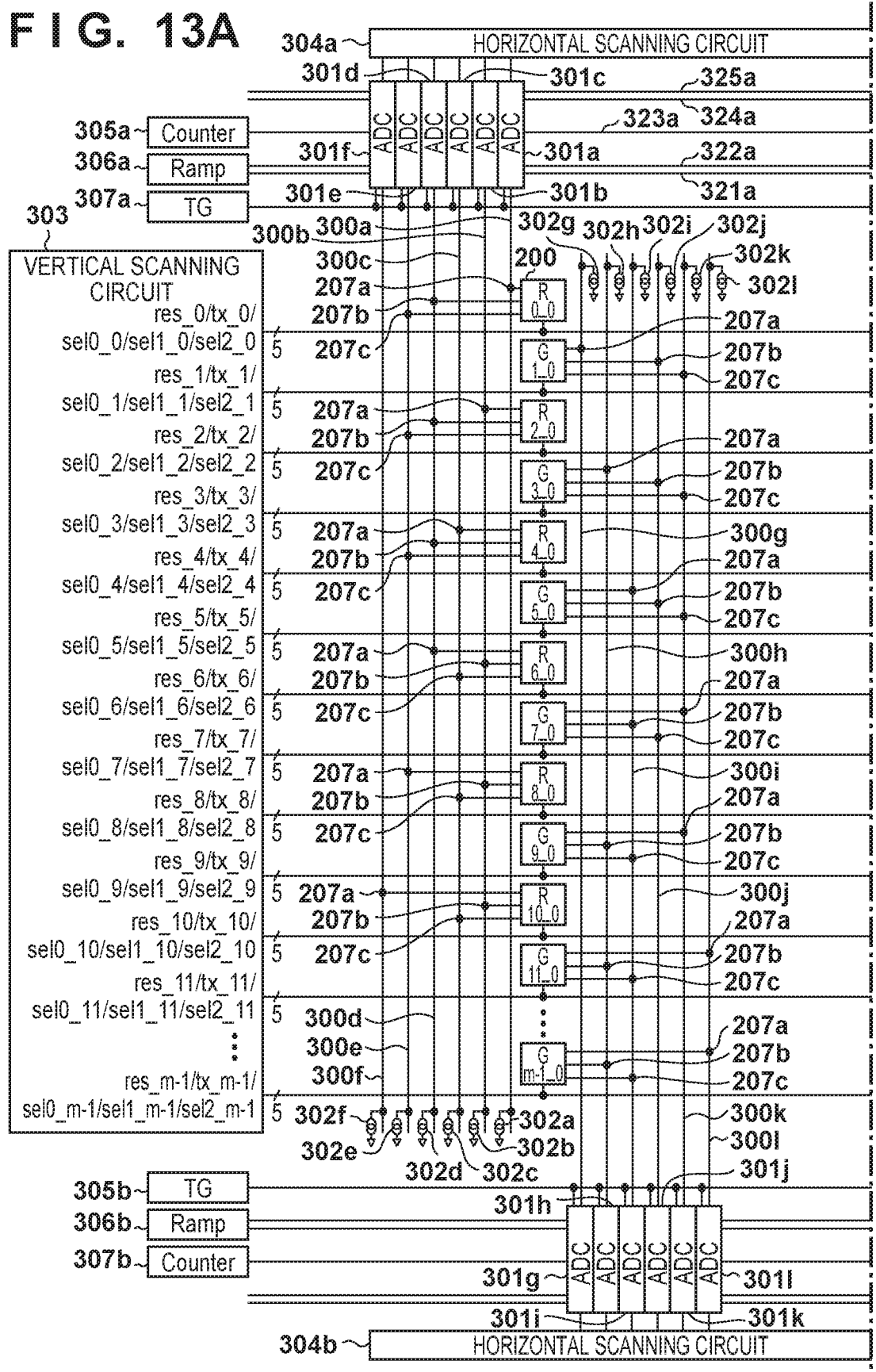
FIGS. 13A and 13B are diagrams illustrating a configuration of an imaging element in the second embodiment.
Figure 13B:
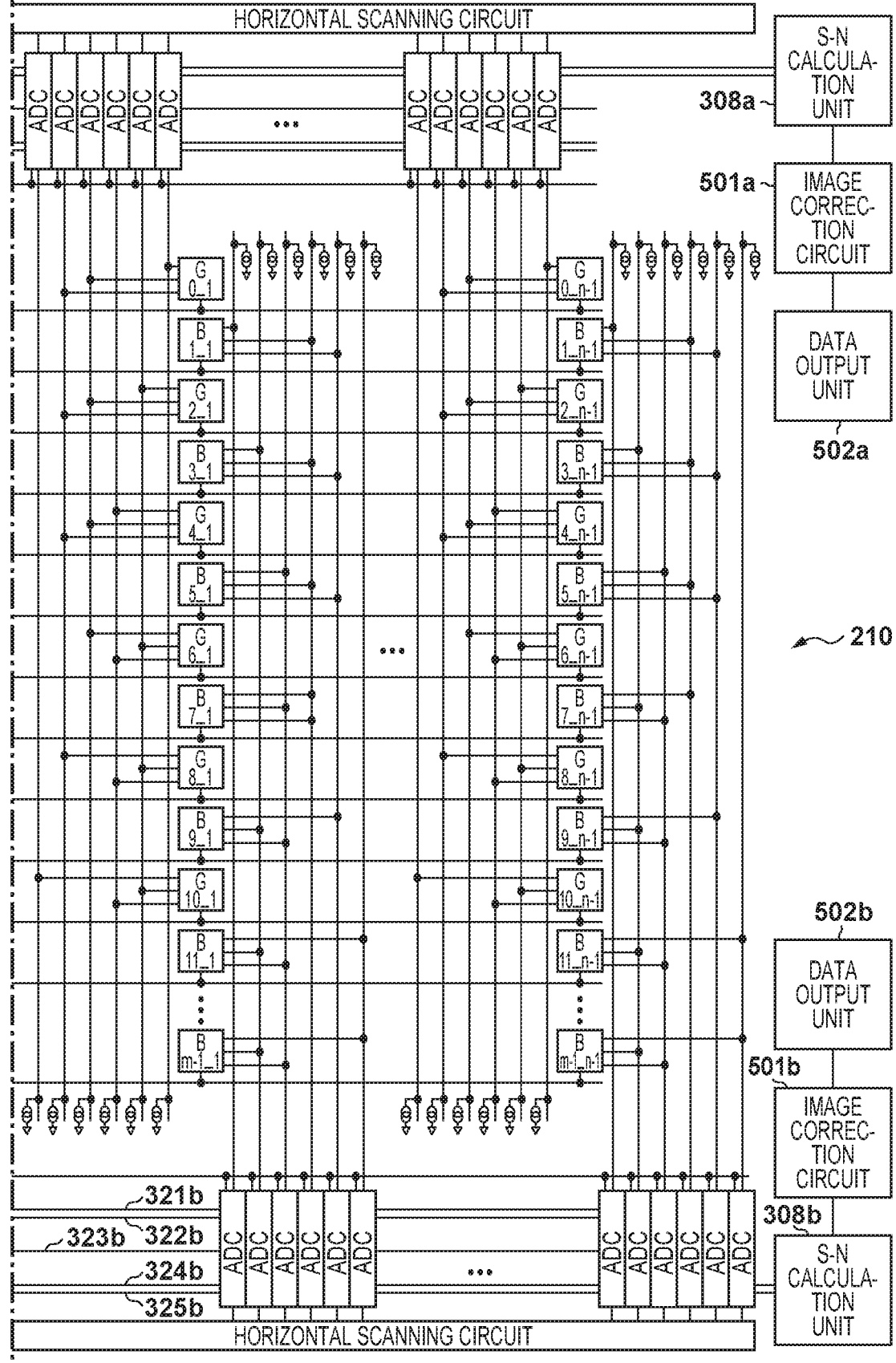

FIGS. 13A and 13B are diagrams illustrating a configuration of the imaging element 500. The image correction circuits 501a and 501b generate correction values based on the correction data outputted from the S-N calculation units 308a and 308b, and correct the image data. The data output units 502a and 502b are of a transmission method such as SLVS (Scalable Low Voltage Signaling).

The image data outputted from the image correction circuits 501a and 501b is outputted from the data output units 502a and 502b to the outside of the imaging element 500. Configurations other than the image correction circuits 501a and 501b and the data output units 502a and 502b are similar to those of the imaging element 100, and therefore description thereof is omitted.

Figure 14:
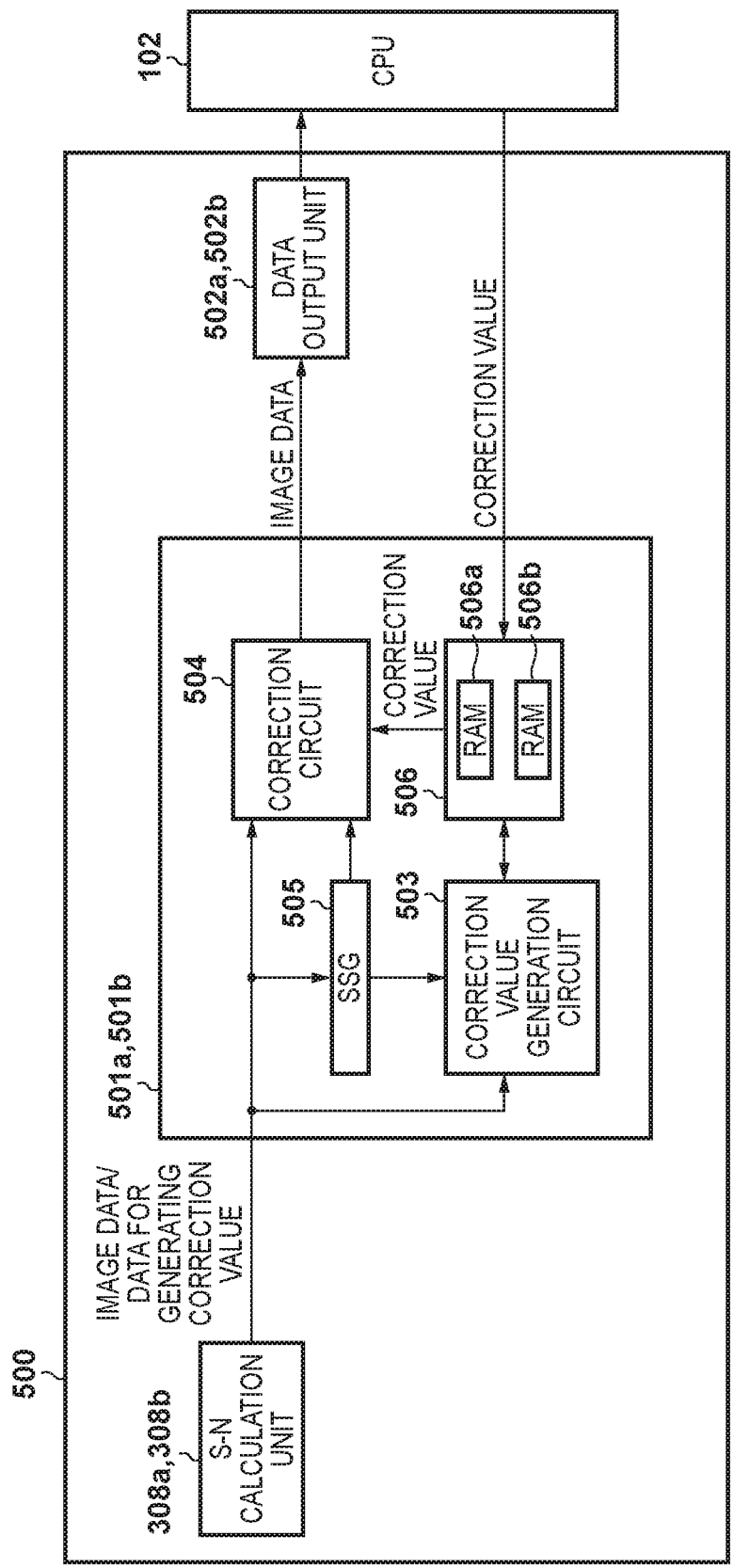
FIG. 14 is a diagram illustrating a configuration of an image correction circuit in the second embodiment.

Next, a configuration of the image correction circuits 501 will be described with reference to FIG. 14. FIG. 14 is a diagram illustrating a configuration of the image correction circuit 501 that includes a connection with the CPU 102. The data inputted from the S-N calculation unit 308a (308b) is input to a correction value generation circuit 503 and a correction circuit 504. An SSG 505 counts the types of input data and the number of input data based on control signals (not illustrated) from the TG 307a (307b), and performs timing control, for correction value generation and correction, in relation to the correction value generation circuit 503 and the correction circuit 504.

The correction value generation circuit 503 generates a correction value for each column circuit (column output line, A/D converter, or the like) based on the SSG 505 timing control signal when the inputted data is correction data, and stores the correction value in the RAM 506. The RAM 506 has a RAM 506a and a RAM 506b. A correction value for an image to be read out is stored in one of the RAMs and used for correction. With the RAM that is not being used for the correction, correction value generation and holding is performed, or it is powered down. The RAM 506a or the RAM 506b has a function of writing a correction value transmitted from the CPU 102.

When the inputted data is image data, the correction circuit 504 subtracts the correction value outputted from the RAM 506 for each column circuit from the image data based on the SSG 505 timing control signals, and performs offset correction. Thereafter, the data is outputted to the CPU 102.

The image correction circuit 501a (501b) of the present embodiment has a similar function to the DFE 101 described in the first embodiment except that the correction value generation circuit 503 and the correction circuit 504 are timing-controlled by the SSG 505 to execute the process. In the DFE 101, the image data and the correction data are separately inputted from the imaging element 100, and the image correction circuit 501a (501b) discriminates the data and performs counting of the number of data in the SSG 505. The content of operation of the image correction circuit 501a (501b), the correction circuit 504, and the RAM 506 is the same as in correction value generation circuit 400, the correction circuit 401, and the RAM 403 of the DFE 101.

Description of operation of the image capturing apparatus 1001 of the present embodiment is omitted because the operation performed by the DFE 101 is only changed to be in the image correction circuit 501a (501b) with respect to the operation of FIG. 4 in the first embodiment.

By the above operation, even when a capturing mode such as the ISO sensitivity is changed in the moving image capturing, a correction corresponding to the capturing mode can be applied to an image without loss of a moving image frame.

In the present embodiment, since it is not necessary to output data for generating a correction value outside the imaging element, the output rate of image data is not limited with respect to the data output interface (I/F) of the imaging element. Further, compared with the case of outputting to the outside of the imaging element, the power consumption can be reduced since the output I/F can be powered down.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-196072, filed Oct. 17, 2018, which is hereby incorporated by reference herein in its entirety.

What is claimed is:

1. An image capturing apparatus comprising:
a pixel region in which a plurality of pixels for performing photoelectric conversion are arranged in a matrix;
a plurality of column output lines parallelly and plurally arranged for each pixel column in the pixel region and to each of which each signal of a plurality of different pixels arranged at same pixel column is outputted;
a plurality of column circuits connected to the plurality of column output lines in a one to one relationship; and
at least one processor or circuit configured to function as the following units:
a correction unit configured to correct image data based on a difference in a characteristic of the plurality of column circuits; and
a control unit configured to control so as to output signal for generating image data to a first column output line of the plurality of column output lines arranged at the same pixel column and to output signal for generating correction data used by the correction unit to a second column output line different from the first column output line among the plurality of column output lines arranged at the same pixel column.

2. The image capturing apparatus according to claim 1, wherein the control unit controls to output signal for generating image data obtained by a first mode to the first column output line, and to output signal for generating correction data corresponding to a second mode that differs from the first mode to the second column output line.

3. The image capturing apparatus according to claim 2, wherein the control unit further controls to output signal for generating image data obtained in the second mode to the second column output line, and controls the correction unit to correct image data obtained in the second mode using a correction data corresponding to the second mode.

4. The image capturing apparatus according to claim 2, wherein the first mode and the second mode have different ISO sensitivities.

5. The image capturing apparatus according to claim 2, wherein the first mode and the second mode have different numbers of bits in AD conversion.

6. The image capturing apparatus according to claim 2, wherein the first mode and the second mode have different numbers of combinations of pixels in the column direction.

7. The image capturing apparatus according to claim 2, wherein the first mode and the second mode have different numbers of combinations of pixels in the row direction.

8. The image capturing apparatus according to claim 1, wherein the signal for generating image data and the signal for generating correction data are outputted via different output units.

9. The image capturing apparatus according to claim 1, wherein the column circuit has a gain that is set for each of the column circuits.

10. The image capturing apparatus according to claim 1, wherein an output period of the signal for generating image data and an output period of the signal for generating correction data overlap.

11. The image capturing apparatus according to claim 1, wherein an output period of the signal for generating image data and an output period of the signal for generating correction data do not overlap.

12. The image capturing apparatus according to claim 1, wherein the control unit controls a column circuit that is not used to be turned off during either of the signal for generating image data output period or the signal for generating correction data output period.

13. The image capturing apparatus according to claim 1, wherein the control unit has a mode for reading a signal of a pixel using only one of the first and second column output line, and a mode for reading a signal of a pixel using the first and second column output line.

14. The image capturing apparatus according to claim 1, wherein the correction unit has a mode for correcting the image data using a correction value obtained using the correction data, and a mode for correcting the image data using a correction value obtained without using the correction data.

15. The image capturing apparatus according to claim 1, wherein the correction unit is built into an imaging element.

16. The image capturing apparatus according to claim 1, wherein the signal for generating correction data is obtained by reading out a signal from a photoelectric conversion element in the pixel region without transferring the signal.

17. A method for controlling an image capturing apparatus that comprises a pixel region in which a plurality of pixels for performing photoelectric conversion are arranged in a matrix, a plurality of column output lines parallelly and plurally arranged for each pixel column in the pixel region and to each of which each signal of a plurality of different pixels arranged at same pixel column is outputted, and a plurality of column circuits connected to the plurality of column output lines in a one to one relationship, the method comprising:

correcting image data based on a difference in a characteristic of the plurality of column circuits;

controlling so as to output signal for generating image data to a first column output line of the plurality of column output lines arranged at the same pixel column and to output signal for generating correction data used by the correcting to a second column output line different from the first column output line among the plurality of column output lines arranged at the same pixel column.

* * * * *